United States Patent
Oono

(10) Patent No.: US 11,394,326 B2
(45) Date of Patent: Jul. 19, 2022

(54) CONTROL METHOD AND CONTROL DEVICE FOR ELECTRIC VEHICLE

(71) Applicant: NISSAN MOTOR CO., LTD., Yokohama (JP)

(72) Inventor: Shou Oono, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 17/293,129

(22) PCT Filed: Nov. 15, 2018

(86) PCT No.: PCT/JP2018/042350
§ 371 (c)(1),
(2) Date: May 12, 2021

(87) PCT Pub. No.: WO2020/100268
PCT Pub. Date: May 22, 2020

(65) Prior Publication Data
US 2022/0014134 A1    Jan. 13, 2022

(51) Int. Cl.
*H02P 21/14* (2016.01)
*B60L 50/51* (2019.01)
(Continued)

(52) U.S. Cl.
CPC ............. *H02P 21/141* (2013.01); *B60L 50/51* (2019.02); *H02P 21/20* (2016.02); *H02P 27/08* (2013.01);
(Continued)

(58) Field of Classification Search
CPC ........ H02P 21/141; H02P 21/20; H02P 27/08; H02P 2207/05; H02P 21/05; H02P 21/06;
(Continued)

(56) References Cited

U.S. PATENT DOCUMENTS

| 6,429,620 B2 * | 8/2002 | Nakazawa .......... H02P 21/0089 318/459 |
| 2015/0372628 A1 * | 12/2015 | Oono ...................... H02P 21/05 318/801 |

FOREIGN PATENT DOCUMENTS

| CN | 104205614 A | * 12/2014 | .......... H02P 21/0025 |
| EP | 1225074 A2 | * 7/2002 | ............... B60K 6/46 |

(Continued)

*Primary Examiner* — Muhammad S Islam
*Assistant Examiner* — Bradley R Brown
(74) *Attorney, Agent, or Firm* — Foley & Lardner LLP

(57) ABSTRACT

A method for controlling an electric vehicle having a field winding type synchronous motor for providing a driving force, the field winding type synchronous motor that has a rotor having a rotor winding and a stator having a stator winding, by controlling a stator current flowing in the stator winding and a rotor current flowing in the rotor winding is provided. The method includes: setting a basic torque command value based on a vehicle information; calculating a d-axis current command value and a first q-axis current command value for the stator current, and a f-axis current command value for the rotor current, based on the basic torque command value and the vehicle information; calculating a magnetic flux estimate value, which is an estimated value of a magnetic flux generated in the rotor, based on the d-axis current command value and the f-axis current command value; calculating a final torque command value, based on the first q-axis current command value and the magnetic flux estimate value; calculating a second q-axis current command value, based on the magnetic flux estimate value and the final torque command value. The method includes further includes controlling the stator current and the rotor current, based on the second q-axis current command value, the d-axis current command value and the f-axis current command value.

11 Claims, 26 Drawing Sheets

(51) Int. Cl.
 *H02P 27/08* (2006.01)
 *H02P 21/20* (2016.01)
(52) U.S. Cl.
 CPC ....... *B60L 2210/40* (2013.01); *B60L 2240/12* (2013.01); *H02P 2207/05* (2013.01)
(58) Field of Classification Search
 CPC ...... H02P 29/50; B60L 50/51; B60L 2210/40; B60L 2240/12; Y02T 10/72
 See application file for complete search history.

(56) References Cited

FOREIGN PATENT DOCUMENTS

| | | | |
|---|---|---|---|
| EP | 2 940 858 A1 | 11/2015 | |
| EP | 2940858 A1 * | 11/2015 | ............ B60L 15/025 |
| JP | 2015-80353 A | 4/2015 | |
| JP | 2015080353 A * | 4/2015 | |
| JP | 5939316 B2 | 6/2016 | |
| JP | 2017-158415 A | 9/2017 | |
| JP | 2017-175853 A | 9/2017 | |
| WO | WO 2014/115626 A1 | 7/2014 | |

\* cited by examiner

CONTROL METHOD AND CONTROL DEVICE FOR ELECTRIC VEHICLE

TECHNICAL FIELD

The present invention relates to a control method and a control device for an electric vehicle.

BACKGROUND ART

Conventionally, an oscillation suppression that reduces the torsional oscillation of a drive shaft connecting a motor to drive wheels is used as a control method for an electric vehicle powered by a synchronous motor using a permanent magnet for a rotor.

SUMMARY OF INVENTION

However, the magnetic flux generated in the motor fluctuates in the motor which does not have the permanent magnet, in contrast to the above-mentioned synchronous motor where the rotor magnetic flux is constant. Therefore, it is difficult to apply the above-mentioned oscillation suppression control without modification to the field magnet winding type synchronous motor that does not have permanent magnet in the rotor.

On the other hand, JP5939316B discloses a method of applying the above-mentioned oscillation suppression control to an induction motor where a rotor flux fluctuates. However, since JP5939316B discloses the control method that applies the above-mentioned suppression control to the induction motor by compensating the torque current based on the excitation current (y-axis current). Therefore, because d-axis current and the current flowing in the field winding of the rotor (f-axis current) are necessary to be taken into account, it is not possible to apply this control method to the field magnet winding type synchronous motor.

The object of the present invention is to provide a technique for applying oscillation suppression control to the field magnet winding type synchronous motor in order to reduce torsional oscillation of the drive shaft connecting the motor to the drive wheels.

According to an aspect of the present invention disclosure, a method for controlling an electric vehicle having a field winding type synchronous motor for providing a driving force, the field winding type synchronous motor that has a rotor having a rotor winding and a stator having a stator winding, by controlling a stator current flowing in the stator winding and a rotor current flowing in the rotor winding is provided. The method includes: setting a basic torque command value based on a vehicle information; calculating a d-axis current command value and a first q-axis current command value for the stator current, and a f-axis current command value for the rotor current, based on the basic torque command value and the vehicle information; calculating a magnetic flux estimate value, which is an estimated value of a magnetic flux generated in the rotor, based on the d-axis current command value and the f-axis current command value; calculating a final torque command value, based on the first q-axis current command value and the magnetic flux estimate value; calculating a second q-axis current command value, based on the magnetic flux estimate value and the final torque command value. The method includes further includes controlling the stator current and the rotor current, based on the second q-axis current command value, the d-axis current command value and the f-axis current command value.

The embodiments of the present invention will be described in detail below referring to the accompanying drawings.

DESCRIPTION OF EMBODIMENTS

The First Embodiment

Figure 1:
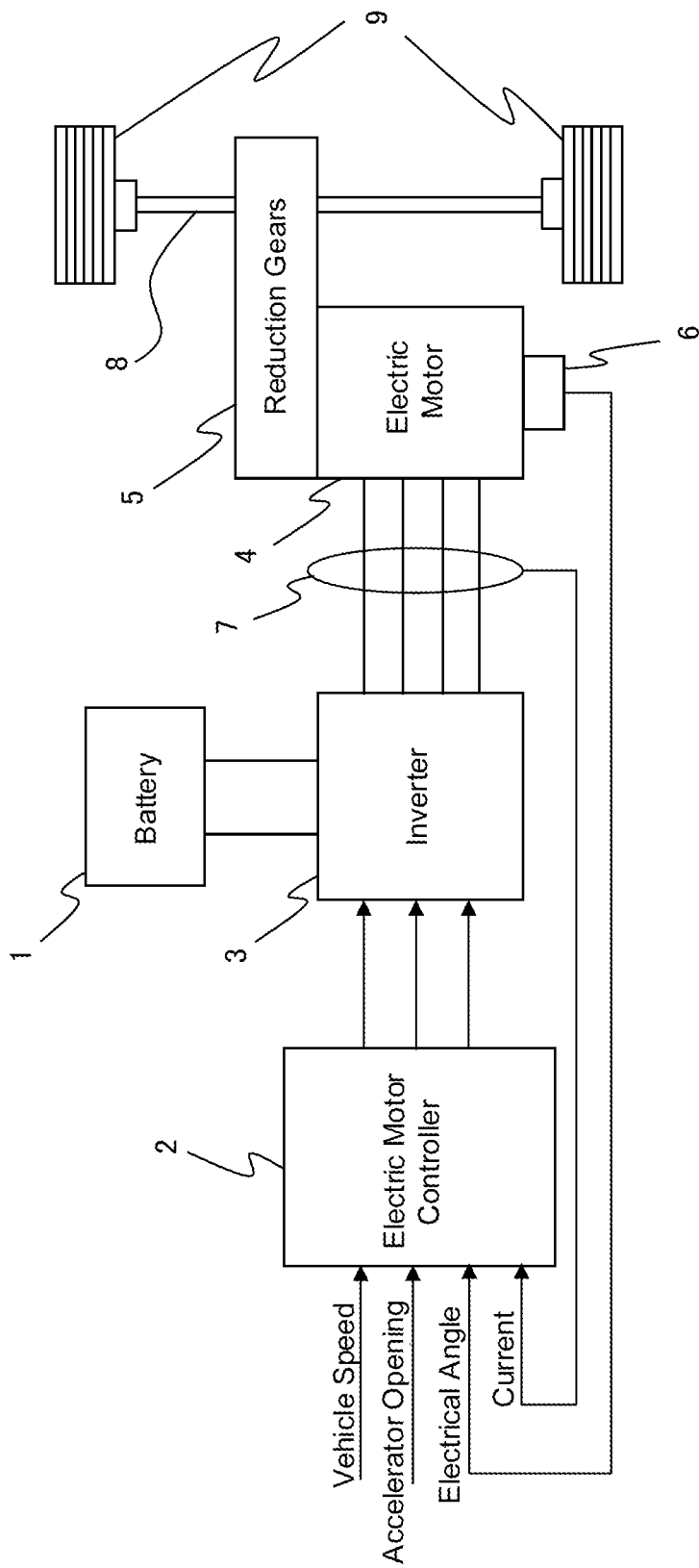
FIG. 1 illustrates a schematic diagram of the vehicle system to which a control method of an electric vehicle of a first embodiment illustrates applied.

FIG. 1 is the block diagram showing an example of the configuration of the motor control system 100 to which the control method for the electric vehicle according to one of the embodiments of the present invention is applied. The electric vehicle is a type of a vehicle that is equipped with at least one field magnet winding type synchronous motor (hereinafter simply referred to as "the motor") as part or all of the driving source of the vehicle and can run by the driving power of the motor, which includes electric vehicles and hybrid vehicles.

A battery 1 discharges the drive power from a field magnet winding type synchronous motor 4 and charges the regenerative power to and for the motor 4.

A electric motor controller 2 (hereinafter referred to simply as "the controller") includes, for example, a central processing unit (CPU), a read-only memory (ROM), a random-access memory (RAM), and an input/output interface (I/O interface). Signals of various vehicle variable parameters indicating the vehicle status, such as a vehicle speed V, an accelerator opening e, an electric angle $\theta_{re}$ of the motor 4, stator currents of the motor 4 ($i_u$, $i_v$, and $i_w$ in the case of three-phase AC), a rotor current ($i_f$) of the motor 4, and the like, are inputted to the controller 2 as digital signals. The controller 2 generates PWM signals in order to control the motor 4 based on the inputted signals. The controller 2 further generates drive signals for the inverter 3 after receiving the generated PWM signals.

The inverter 3 converts the DC current supplied from the battery 1 to the AC current or oppositely inverts the latter to the former by turning on and off two switching elements (e.g., power semiconductor elements such as IGBT and MOS-FET) provided for each phase in order to control the stator current, such that the desired current flows in the motor 4. With the inverter 3, the two pairs (four in total) of the switching elements (e.g., the power semiconductor elements such as IGBT and MOS-FET) are connected to both ends of the rotor winding, in order to control the rotor current. By turning the switching elements on and off in response to the drive signal, the desired current flows through the rotor winding. However, if the number of directions of the current flowing in the rotor is only one, the two diagonally positioned switching elements of the two pairs of the switching elements may be replaced with diodes.

The field magnet winding type synchronous motor 4 (hereinafter simply referred to as "the motor 4") is a field magnet winding type synchronous motor which includes the rotor with a rotor winding (field winding) and the stator with a stator winding (armature winding). When the motor control system 100 of this embodiment is mounted in the vehicle, the motor 4 works as the drive source for the vehicle. As will be described in detail later, the motor 4 is controlled by controlling the rotor current flowing through the rotor winding and the stator current flowing through the stator winding. The motor 4 generates a drive torque by the current supplied from the inverter 3, and transmits the drive power to the right and left drive wheels 9 via the reduction gear 5 and a drive shaft 8. In addition, the motor 4 collects the kinetic energy of the vehicle as electric energy by making a regenerating breaking force when the motor is rotated by the drive wheels 9 together with the motor while the vehicle is running. In this case, the inverter 3 inverts the AC current generated during the regeneration operation of the motor 4 into DC current and supplies the DC current to the battery 1.

A current sensor 7 detects the three-phase currents $i_u$, $i_v$, and $i_w$ (stator currents) flowing in the stator winding of the motor 4, and also detects the current $i_f$ (rotor current) flowing in the rotor winding of the motor 4. However, for the stator current, since the sum of the three-phase AC currents $i_u$, $i_v$, and $i_w$ is zero, the current of any two phases may be detected and the current of the remaining one phase may be obtained by calculation.

The rotation sensor 6 is, for example, a resolver or encoder that detects the rotor phase a of the motor 4.

Figure 2:
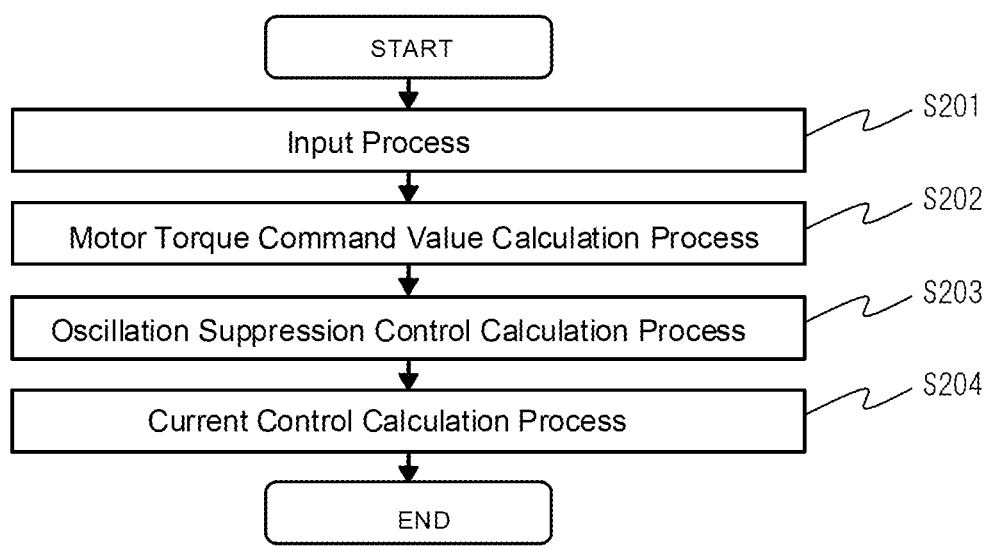
FIG. 2 illustrates a flowchart showing a flow of processing performed by an electric motor controller.

FIG. 2 illustrates a flowchart showing a flow of processing performed by the controller 2. The processing from step S201 to step S204 is programmed in the controller 2 to be constantly executed at certain intervals while the vehicle system is running.

In step S201, a signal indicating the vehicle state is inputted to the controller 2. Here, a vehicle speed V (km/h), an accelerator opening θ (%), an electric angle $\theta_{re}$ of the motor 4, a motor rotation speed Nm (rpm) of the motor 4, the currents $i_u$, $i_v$, $i_w$, and $i_f$ flowing in the motor 4, and a DC voltage $V_{dc}$ (V) of the battery 1 are inputted to the controller 2.

The vehicle speed V (km/h) is obtained by the communication from a meter (not shown), while examples of the meter are a vehicle speed sensor, or another controller such as a brake controller. Alternatively, the controller 2 obtains the vehicle speed V (m/s) by multiplying the rotor mechanical angular velocity $\omega_m$ by a tire dynamic radius r, and dividing the product of the multiplication by the gear ratio of the final gear, and then multiplying the quotient of the division by the unit conversion factor from m/s to km/s (3600/1000).

The accelerator opening θ (%) is obtained from the accelerator opening sensor, which is not shown in the figure. The accelerator opening θ (%) may be made to be obtained from other controllers such as a vehicle controller not shown in the figure.

The electric angle $\theta_{re}$ (rad) of the motor 4 is obtained from the rotation sensor 6. The rotation speed $N_m$ (rpm) of the motor 4 is obtained by dividing the electric angular velocity co, by the number of pole pairs p of the electric motor to obtain the motor rotation speed detection value $\omega_m$ (rad/s), which is the mechanical angular velocity of the motor 4, and then multiplying the obtained motor rotation speed detection value $\omega_m$ by the unit conversion factor (60/(2π)) from rad/s to rpm.

The currents $i_u$, $i_v$, $i_w$, and $i_f$ (A) flowing in the motor 4 are obtained by the current sensor 7.

The DC voltage $V_{dc}$ (V) is detected by the voltage sensor (not shown) mounted in the DC power line between the battery 1 and the inverter 3. The DC voltage $V_{dc}$ (V) may be detected by a signal transmitted from a battery controller (not shown).

Figure 3:
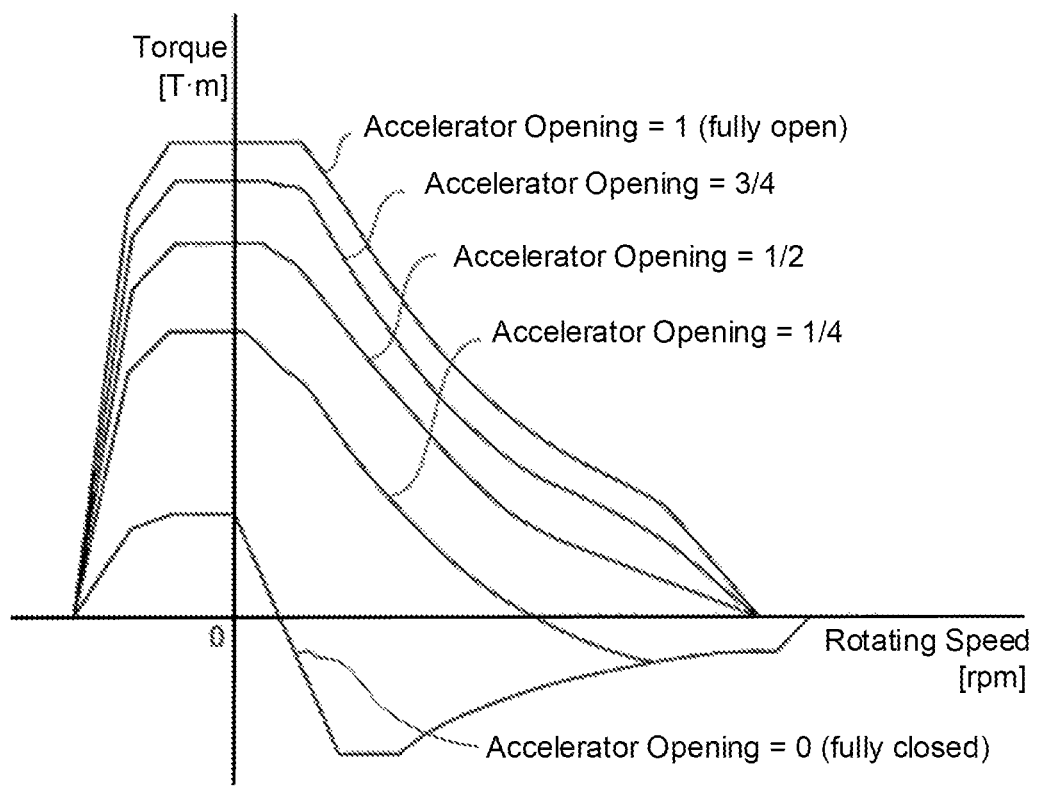
FIG. 3 illustrates a figure showing an example of an accelerator opening-torque table.

In step S202, a motor torque command value calculation process is executed. In the motor torque command value calculation process, a motor torque command value (basic torque command value) $T_m^*$ is set by referring to an accelerator opening-torque table shown in FIG. 3 based on the accelerator opening e and vehicle speed V inputted in step S201.

In step S203, an oscillation suppression control calculation process is executed. Specifically, the controller 2 calculates a q-axis current command value $i_{q2}^*$, a d-axis current command value $i_{d1}^*$, and a f-axis current command value $i_{f1}^*$ that suppress the driving force transmission system oscillation (torsional oscillation of the drive shaft 8, etc.) without losing the response of the drive shaft torque based on the motor torque command value $T_m^*$ set in step S202. The details of the oscillation suppression control calculation process will be described later.

In step S204, a current control calculation processing is performed. In the current control calculation process, a current control is performed to make a d-axis current $i_d$, a q-axis current $i_q$, and a f-axis current $i_f$ match the q-axis current command value $i_{q2}{}^*$, the d-axis current command value $i_{d1}{}^*$ and the f-axis current command value $i_{f1}{}^*$ calculated in step S203, respectively. The details of the current control calculation process will be explained using FIG. 4 below.

Figure 4:
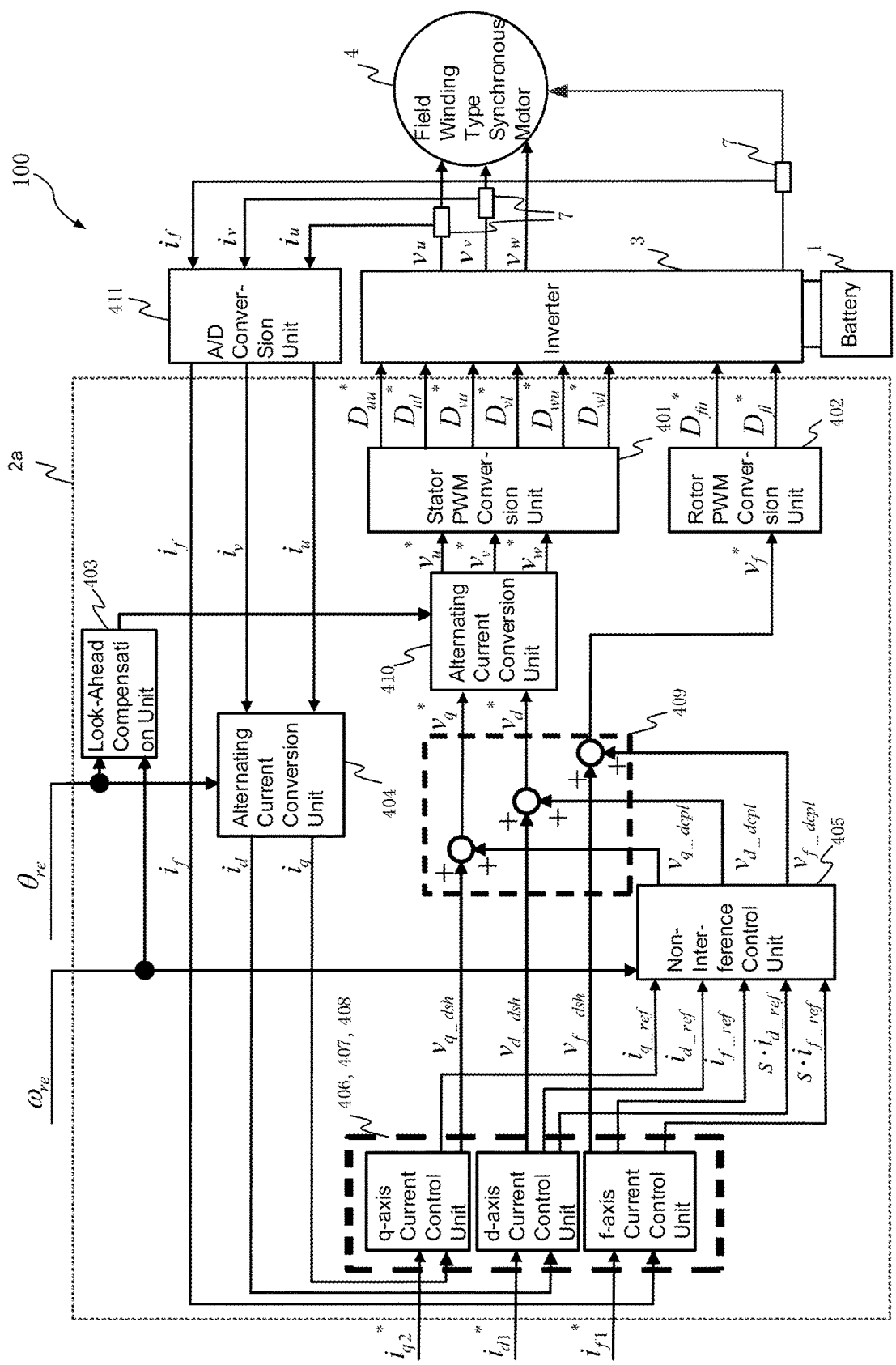
FIG. 4 illustrates a block diagram of the motor control system of the first embodiment.

FIG. 4 illustrates a figure showing an example of the configuration of the motor control system 100 and alternatively a control block diagram of a current control calculation processing unit 2a, which is provided in the controller 2 as a functional section. The controller 2 executes the current control calculation processing shown in step S204 using the current control calculation processing unit 2a.

The current control calculation processing unit 2a includes a stator PWM conversion unit 401, a rotor PWM conversion unit 402, a look-ahead compensation unit 403, coordinate conversion units 404, 410, a non-interference control unit 405, a q-axis current control unit 406, a d-axis current control unit 407, an f-axis current control unit 408, a voltage command value calculation unit 409, and an A/D converter 411.

The stator PWM conversion unit 401 generates PWM_Duty drive signals (power electric element drive signals) $D_{uu}{}^*$, $D_{ul}{}^*$, $D_{vu}{}^*$, $D_{vl}{}^*$, $D_{wu}{}^*$, $D_{wl}{}^*$ provided in the inverter 3 and outputs the signals to the inverter 3 based on three-phase voltage command values $v_u{}^*$, $v_v{}^*$, and $v_w{}^*$ outputted from a coordinate conversion unit 410 described below.

The rotor PWM conversion unit 402 generates PWM_Duty drive signals $D_{fu}{}^*$ and $D_{fl}{}^*$ for the rotor switching elements provided in the inverter 3 based on a f-axis voltage command value $v_f{}^*$ described below and outputs the generated signals to the inverter 3.

The inverter 3 generates the AC voltages $v_u$, $v_v$, and $v_w$ for controlling the d-axis currents $i_d$ and the q-axis current $i_q$ flowing in the rotor winding of the motor 4 based on the PWM_Duty drive signals generated in the stator PWM conversion unit 401 and supplies the signals to the motor 4. In addition, the inverter 3 generates the f-axis voltage $v_f$ for controlling the f-axis current $i_f$ flowing in the rotor winding of the motor 4 based on the PWM_Duty drive signal generated by the rotor PWM converter 402, and supplies the signal to the motor 4.

The current sensor 7 detects currents in at least two phases, e.g. the u-phase current $i_u$ and v-phase current $i_v$, of the three-phase AC current supplied from the inverter 3 to the motor 4. The detected two phase currents $i_u$ and $i_v$ are converted into digital signals by the A/D (analog/digital) conversion unit 410 and are inputted to the coordinate transformation unit 404. The current sensor 7 simultaneously detects the f-axis current $i_f$ supplied to the motor 4 from the inverter 3. The detected f-axis current $i_f$ is converted into a digital signal by the A/D converter 411, and is outputted to the f-axis current control unit 408.

The look-ahead compensation unit 403 accepts the electric angle $\theta_{re}$ and the electric angular velocity $\omega_{re}$, and calculates a look-ahead compensated electric angle $\theta_{re}'$ by adding a multiplication product to the electric angle $\theta_{re}$, while the multiplication product is calculated by multiplying the electric angular velocity $\omega_{re}$ and the latent time that the control system has missed. The look-ahead compensated electric angle $\theta_{re}'$ is outputted to the coordinate transformation unit 404.

The coordinate transformation unit 404 performs a transformation step from the three-phase AC coordinate system (uvw axes) to the orthogonal two-axes DC coordinate system (d-q axes). Specifically, the coordinate transformation unit 404 calculates the d-axis current $i_d$ and the q-axis current $i_q$ by performing the coordinate transformation process from the u-phase current $i_u$, the v-phase current $i_v$, the w-phase current $i_w$, and the electric angle $\theta_{re}$, using the following equation (1).

[Equation 1]

$$\begin{bmatrix} i_d \\ i_q \end{bmatrix} = \begin{bmatrix} \cos\theta_{re} & \sin\theta_{re} \\ -\sin\theta_{re} & \cos\theta_{re} \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{us} \\ i_{vs} \\ i_{ws} \end{bmatrix} \quad (1)$$

In a non-interference control unit 405 accepts a d-axis current normative response $i_{d\_ref}$, a q-axis current normative response $i_{q\_ref}$, a f-axis current normative response $i_{f\_ref}$, a d-axis current normative response derivative value, $s \cdot i_{d\_ref}$, and a f-axis current normative response derivative value $s \cdot i_{f\_ref}$, and calculates non-interference voltages $v_{d\_dcpl}$ and $v_{d\_dcpl}$ and $v_{f\_dcpl}$ for offsetting the interference voltages between the d-axis, q-axis, and f-axis using the voltage equation shown by the equation (2) below. The equation (2) below is a voltage equation of the field magnet winding type synchronous motor 4, which is the control target of the present embodiment.

[Equation 2]

$$\begin{bmatrix} v_d \\ v_q \\ v_f \end{bmatrix} = \begin{bmatrix} R_a + sL_d' & -\omega_{re}L_q & sM' \\ \omega_{re}L_d & R_a + sL_q' & \omega_{re}M \\ sM' & 0 & R_f + sL_f' \end{bmatrix} \begin{bmatrix} i_d \\ i_q \\ i_f \end{bmatrix} \quad (2)$$

Where each parameters of the above equation (2) represent as follows. Note that "s" in the equation is Laplace operation indicator.

$I_d$: d-axis current
$I_q$: q-axis current
$I_f$: f-axis current
$V_d$: d-axis voltage
$V_q$: q-axis voltage
$V_f$: f-axis voltage
$L_d$: d-axis inductance
$L_w$: q-axis inductance
$L_f$: f-axis inductance
M: Mutual inductance between the stator and rotor
$L_d'$: d-axis dynamic inductance
$L_q'$: q-axis dynamic inductance
$L_f'$: f-axis dynamic inductance
M': Dynamic mutual inductance between the stator and rotor
$R_a$: Stator winding resistance
$R_f$: Rotor winding resistance
$\omega_{re}$: Electric angular velocity If the non-interference control by the non-interference control unit 405 functions ideally, the voltage equation in the equation (2) above can be diagonalized as shown in the equation (3) below.

[Equation 3]

$$\begin{bmatrix} v_d \\ v_q \\ v_f \end{bmatrix} = \begin{bmatrix} R_a + sL'_d & 0 & 0 \\ 0 & R_a + sL'_q & 0 \\ 0 & 0 & R_f + sL'_f \end{bmatrix} \begin{bmatrix} i_d \\ i_q \\ i_f \end{bmatrix} \quad (3)$$

According to the above equation (3), the characteristic values for the d-axis, q-axis, and f-axis from the voltage to the current become the primary delay as shown in the equations (4), (5), and (6) below, respectively.

[Equation 4]

$$i_d = \frac{1}{R_a + sL'_d} \cdot v_d \quad (4)$$

[Equation 5]

$$i_q = \frac{1}{R_a + sL'_q} \cdot v_q \quad (5)$$

[Equation 6]

$$i_f = \frac{1}{R_f + sL'_f} \cdot v_f \quad (6)$$

The q-axis current control unit 406 calculates the first q-axis voltage command value $v_{q\_dsh}$, such that the measured value of the actual current (real current) is followed by the q-axis current command value $i_{q2}*$ (the second q-axis current command value) with the desired response having no steady-state deviation, and outputs the first q-axis voltage command value $v_{q\_dsh}$ to the voltage command value calculation unit 409. The details of the q-axis current control unit 406 will be described later using FIG. 5.

The d-axis current control unit 407 calculates the first d-axis voltage command value $v_{d\_dsh}$, such that the measured value of the actual current (real current) is followed by the d-axis current command value $i_{d1}*$ with the desired response having no steady-state deviation, and outputs the first d-axis voltage command value $v_{d\_dsh}$ to the voltage command value calculation unit 409. The details of the d-axis current control unit 407 will be described later using FIG. 6.

The f-axis current control unit 408 calculates the first f-axis voltage command value $v_{f\_dsh}$, such that the measured value of the actual current (real current) is followed by the f-axis current command value $i_n*$ with the desired response having no steady-state deviation, and outputs the first f-axis voltage command value $v_{f\_dsh}$ to the voltage command value calculation unit 409. The details of the f-axis current control unit 408 will be described later using FIG. 7.

Figure 5:
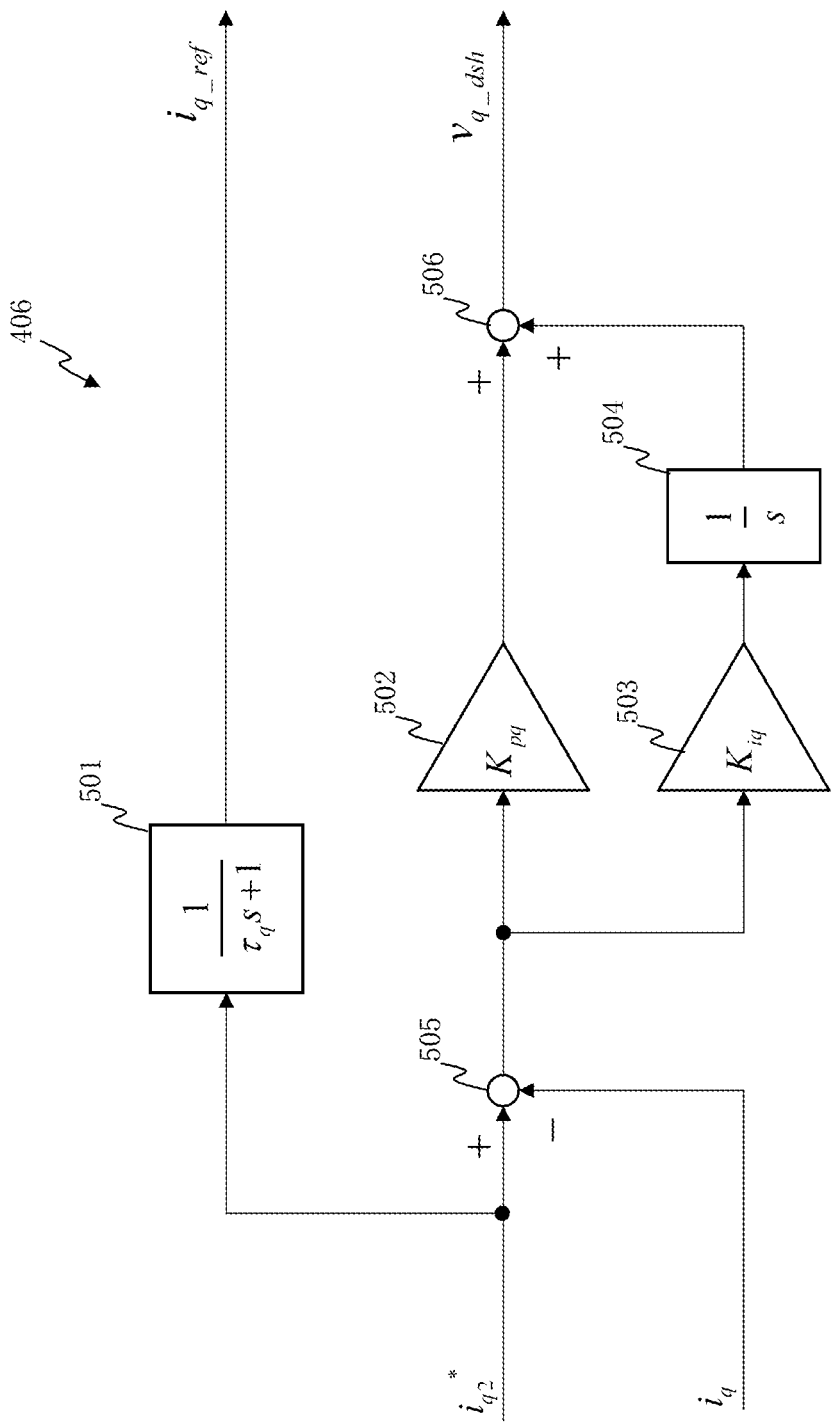
FIG. 5 illustrates a block diagram of a q-axis current control unit.

FIG. 5 illustrates a diagram showing the detail of the q-axis current control unit 406 of the present embodiment. The q-axis current control unit 406 includes a control block 501, gain blocks 502, 503, an integrator 504, a subtractor 505, and an adder 506.

The control block 501 represents a transmission characteristic $1/(\tau_q s+1)$ of the primary delay that simulates the response delay of the actual current $i_{q2}*$ for the q-axis current command value $i_{q2}*$. The control block 501 takes the q-axis current command value $i_{q2}*$ as the input and outputs the q-axis current normative response $i_{q\_ref}$. Here, "$\tau_q$" in the transmission characteristic $1/(\tau_q s+1)$ represents a q-axis current normative response time constant.

The gain block 502 represents a proportional gain $K_{pq}$, which is expressed by the following equation (7). The gain block 502 takes as the input a deviation between the q-axis current command value $i_{q2}*$ and the q-axis current $i_q$, and outputs a value obtained by multiplying the input value by the proportional gain $K_{pq}$ to the adder 506.

[Equation 7]

$$K_{pq} = \frac{L'_q}{\tau_q} \quad (7)$$

The gain block 503 represents the proportional gain $K_{iq}$, and is expressed by the following equation (8). The gain block 503 takes a deviation between the q-axis current command value $i_{q2}*$ and the q-axis current $i_q$ as the input, and outputs a value obtained by multiplying the input value by the proportional gain $K_{iq}$ to the integrator 504. The output from the integrator 504 is inputted to the adder 506.

[Equation 8]

$$K_{iq} = \frac{R_a}{\tau_q} \quad (8)$$

The adder 506 calculates the first q-axis voltage command value $V_{q\_dsh}$ by adding together the output of the gain block 502 and the output from the integrator 504. As described above, the q-axis current control unit 406 can allow the transmission characteristic from the q-axis current command value $i_{q2}*$ to the q-axis current $i_q$ to match the normative response shown in the equation (9) below by setting each of the gain blocks 502 and 503 as shown in the equations (7) and (8) above.

[Equation 9]

$$i_q = \frac{1}{\tau_q s + 1} \cdot i_{q2}^* \quad (9)$$

Figure 6:
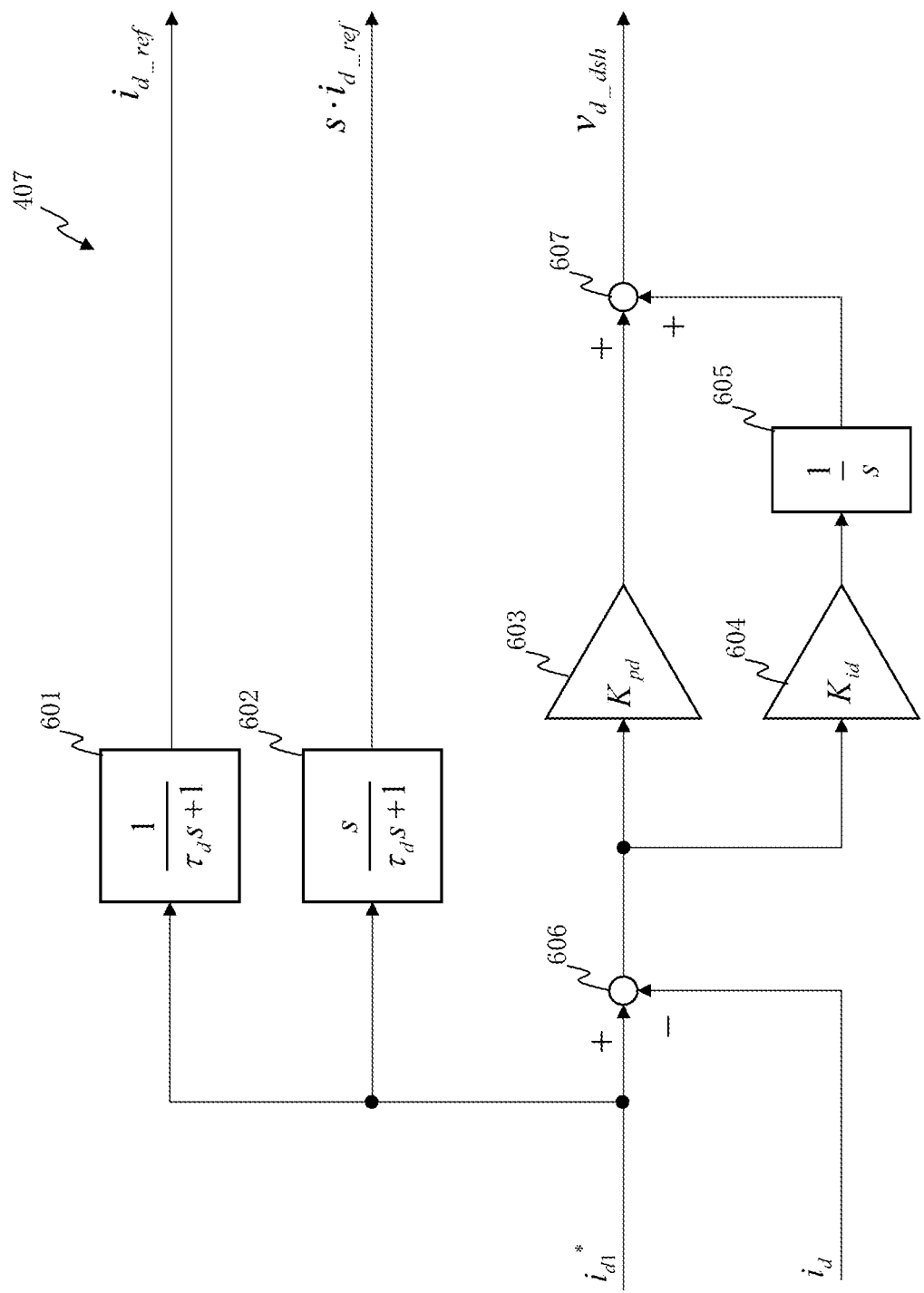
FIG. 6 illustrates a block diagram of a d-axis current control unit.

FIG. 6 illustrates a diagram showing details of the d-axis current control unit 407 of the present embodiment. The d-axis current control unit 407 includes control blocks 601, 602, and gain blocks 603, 604, an integrator 605, a subtractor 606, and an adder 607.

The control block 601 is a primary delay transmission characteristic (d-axis current transmission characteristic) $1/(\tau_d s+1)$, which simulates the response delay of the actual current (d-axis current $i_d$) for the d-axis current command value $i_{d1}*$. The control block 601 takes the d-axis current command value $i_{d1}*$ as the input and outputs the d-axis current normative response $i_{d\_ref}$. The $\tau d$ included in the transmission characteristic $1/(\tau_d s+1)$ is the time constant of the d-axis current normative response.

The control block 602 has the calculation function for the transmission characteristic $s/(\tau_d s+1)$ that calculates the derivative of the d-axis current normative response $i_{d\_ref}$ for the d-axis current command value $i_{d1}*$. The control block 602 takes the d-axis current command value $i_{d1}*$ as the input and outputs the d-axis current normative response derivative value, $s \cdot i_{d\_ref}$.

The gain block 603 represents the proportional gain $K_{pd}$, which is expressed by the following equation (10). The gain block 603 takes a deviation between the d-axis current command value $i_{d1}^*$ and the d-axis current $i_d$ as the input, and outputs a value obtained by multiplying the inputted value by the proportional gain $K_{pd}$ to the adder 607.

[Equation 10]

$$K_{pd} = \frac{L'_d}{\tau_d} \quad (10)$$

The gain block 604 represents the proportional gain $K_{id}$ which is expressed by the following equation (11). The gain block 604 takes a deviation between the d-axis current command value $i_{d1}^*$ and the d-axis current $i_d$ as the input, and outputs a value obtained by multiplying the inputted value by the proportional gain $K_{id}$ to the integrator 605. The output of the integrator 605 is inputted to the adder 607.

[Equation 11]

$$K_{id} = \frac{R_a}{\tau_d} \quad (11)$$

the adder 607 calculates the first d-axis voltage command value $v_{d\_dsh}$ by adding together the output of the gain block 603 and the output of the integrator 605. As described above, the d-axis current control unit 407 can allow the transmission characteristic from the d-axis current command values from $i_{d1}^*$ to the d-axis current $i_d$ to match the normative response shown in the following equation (12) by setting each of the gain blocks 603 and 604 as shown in the above equations (10) and (11).

[Equation 12]

$$i_d = \frac{1}{\tau_d s + 1} \cdot i_{d1}^* \quad (12)$$

Figure 7:
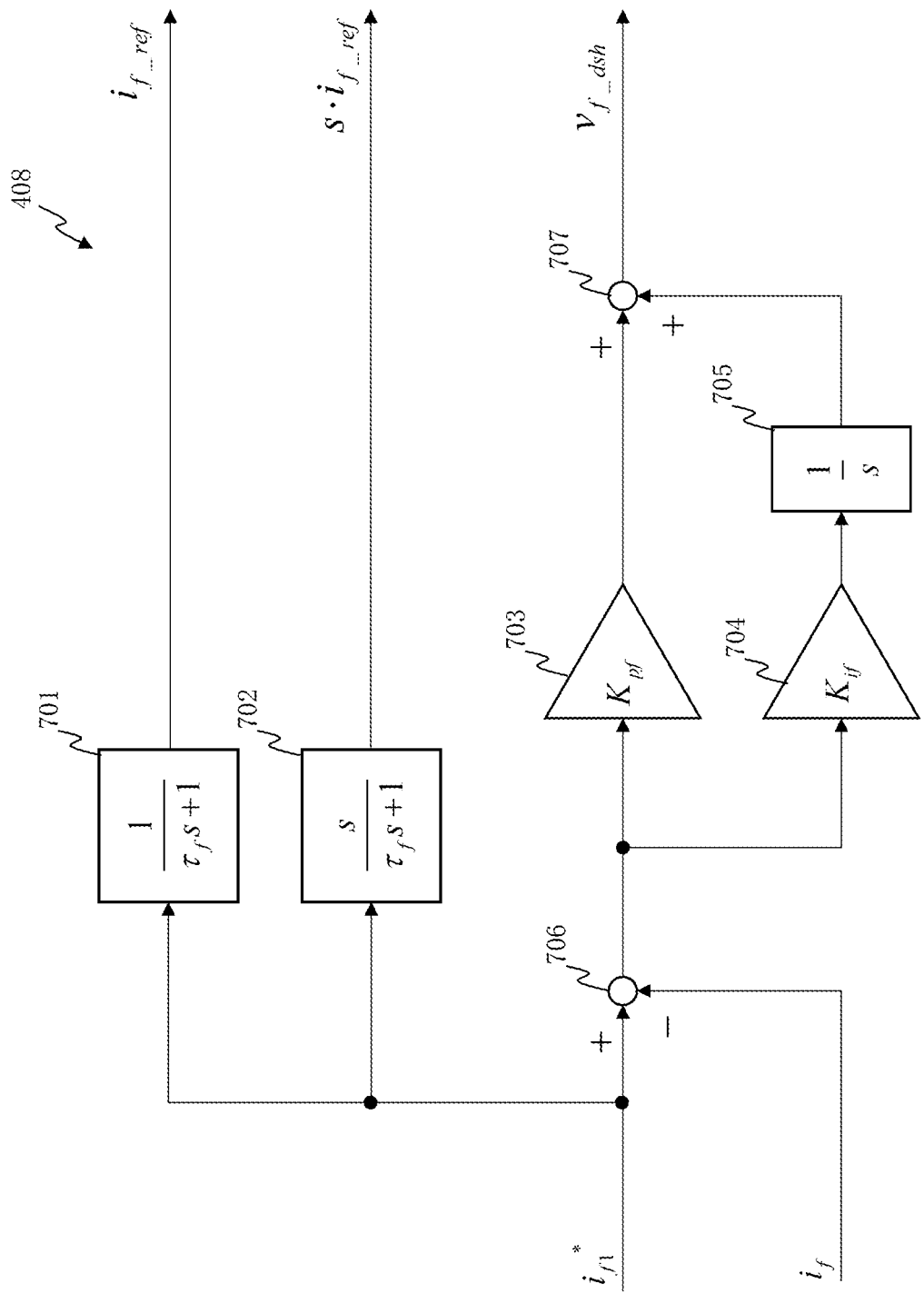
FIG. 7 illustrates a block diagram of a f-axis current control unit.

FIG. 7 shows the diagram illustrating the details of the f-axis current control unit 408 of the present embodiment. The f-axis current control unit 408 includes control blocks 701 and 702, gain blocks 703 and 704, an integrator 705, a subtractor 706, and an adder 707.

The control block 701 has the calculation function for the transmission characteristic $1/(\tau_f s+1)$ with the primary delay that simulates the response delay of the actual current $i_f$ for the f-axis current command value $i_{f1}^*$. The control block 701 takes the f-axis current command value $i_{f1}^*$ as the input and outputs the f-axis current normative response $i_{f\_ref}$. Note that $\tau_f$ in the transmission characteristic $1/(\tau_f s+1)$ represents the f-axis current normative response time constant.

The control block 702 has the calculation function for the transmission characteristic $s/(\tau_f s+1)$ that calculates the derivative of the f-axis current normative response $i_{f\_ref}$ for the f-axis current command value $i_{f1}^*$. The control block 702 takes the f-axis current command value $i_{f1}^*$ as the input and outputs the f-axis current normative response derivative value $s \cdot i_{f\_ref}$.

The gain block 703 represents the proportional gain $K_{pf}$, which is expressed by the following equation (13). The gain block 703 takes a deviation between the f-axis current command value $i_{f1}^*$ and the f-axis current $i_f$ as the input, and outputs a value obtained by multiplying the input value by the proportional gain $K_{pf}$ to the adder 707.

[Equation 13]

$$K_{pf} = \frac{L'_f}{\tau_f} \quad (13)$$

The gain block 704 represents the integrator gain $K_{if}$, and is expressed by the following equation (14). The gain block 704 takes a deviation between the f-axis current command value $i_{f1}^*$ and the f-axis current $i_f$ as the input, and outputs a value obtained by multiplying the inputted value by the proportional gain $K_{if}$ to the integrator 705. The output of the integrator 705 is inputted to the adder 707.

[Equation 14]

$$K_{if} = \frac{R_f}{\tau_f} \quad (14)$$

The adder 707 calculates the first f-axis voltage command value $v_{f\_dsh}$ by adding together the output of the gain block 703 and the output of the integrator 705. As described above, by setting each of the gain blocks 703 and 704 as shown in the equations (13) and (14) above, the f-axis current control unit 408 can allow the transmission characteristic from the f-axis current command value $i_{f1}^*$ to the f-axis current $i_f$ to match the normative response shown in the equation (15) below.

[Equation 15]

$$i_f = \frac{1}{\tau_f s + 1} \cdot i_{f1}^* \quad (15)$$

Referring back to FIG. 4, the explanation will be continued. The voltage command value calculation unit 409 compensates the first q-axis voltage command value $v_{q\_dsh}$, the first d-axis voltage command value $v_{d\_dsh}$, and the first f-axis voltage command value $v_{f\_dsh}$, which are the outputs of the q-axis current control unit 406, the d-axis current control unit 407, and the first f-axis voltage command value $v_{f\_dsh}$, by using the non-interference voltages $v_{q\_dcpl}$, $v_{d\_dcpl}$, and $v_{f\_dcpl}$, which are the outputs of the non-interference control unit 405 respectively (the compensations are made by adding in this embodiment). Then, the voltage command value calculation unit 409 outputs the second q-axis voltage command value $v_q^*$ and the second d-axis voltage command value $v_d^*$ obtained by the compensation to the coordinate conversion unit 410, and outputs the second f-axis voltage command value $v_f^*$ to the rotor PWM conversion unit 402.

The coordinate conversion unit 410 performs a conversion from the orthogonal two-axes DC coordinate system (d-q axis) in the condition of rotating at an electric angular velocity $\omega_{re}$ to the three-phase AC coordinate system (uvw phase). Specifically, the coordinate conversion unit 410 calculates the voltage command values $v_u^*$, $v_v^*$, and $v_w^*$ by performing the coordinate conversion processing using the following equation (16) from the inputted second d-axis voltage command value $v_d^*$, the second q-axis voltage command value $v_q^*$, and the electrical angle $\theta_{re}'$ after look-ahead compensation.

[Equation 16]

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta'_{re} & -\sin\theta'_{re} \\ \sin\theta'_{re} & \cos\theta'_{re} \end{bmatrix} \begin{bmatrix} v_d^* \\ v_q^* \end{bmatrix} \quad (16)$$

Next, the details of the oscillation suppression process performed in step S203 (see FIG. 2) will be described.

Figure 8:
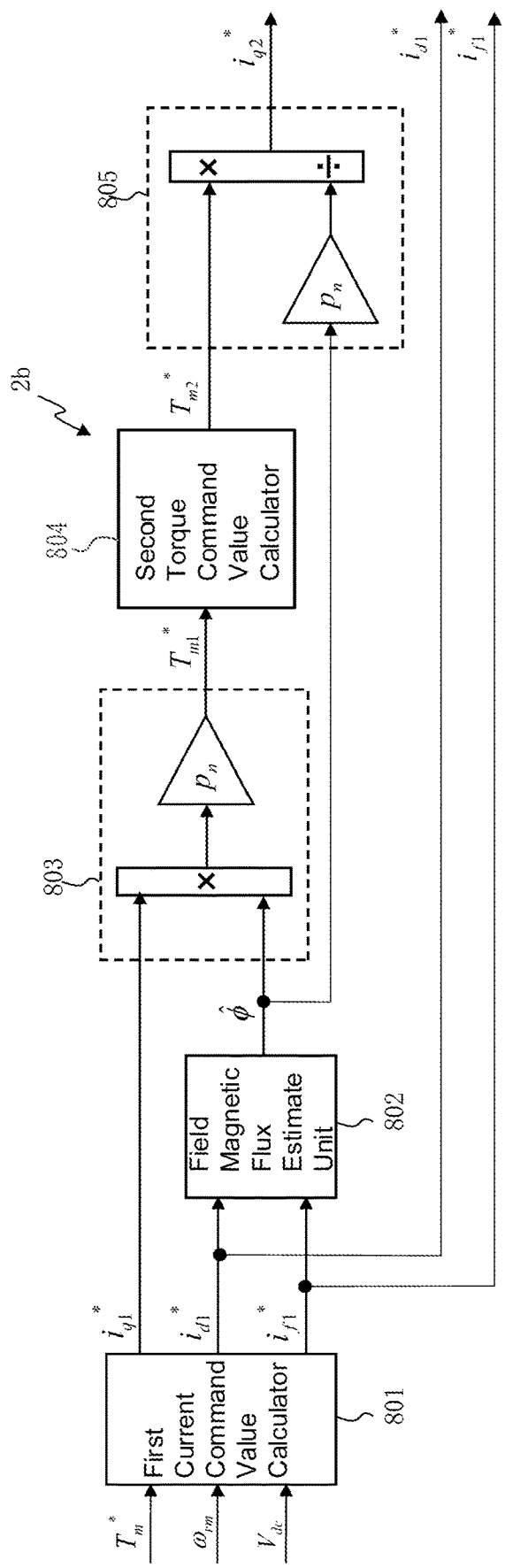
FIG. 8 illustrates a block diagram of an oscillation suppression control processing unit.

FIG. 8 illustrates a control block diagram of an oscillation suppression calculation processing unit 2b provided in the controller 2 as a function unit. The controller 2 performs the oscillation control process pertaining to step S203 using the oscillation suppression calculation processing unit 2b.

The oscillation suppression calculation processing unit 2b includes a first current command value calculator 801, a magnetic flux estimator 802, a first torque command value calculator 803, a second torque command value calculator 804, and a second q-axis current command value calculator 805.

The first current command value calculator 801 calculates the q-axis current command value $i_{q1}^*$, the d-axis current command value $i_{d1}^*$, and the f-axis current command value $i_{f1}^*$ from the input of the motor torque command value $T_m^*$, the motor rotation speed (machine angular velocity) $\omega_{rm}$, and the DC voltage $V_{dc}$. The first current command value calculator 801 stores beforehand a map data which shows a relationship between each of the q-axis current command value $i_{q2}^*$, the d-axis current command value $i_{d1}^*$, and the f-axis current command value $i_{f1}^*$, and the motor torque command value (basic torque command value) $T_m^*$, the motor rotation speed (machine angle speed) $\omega_{rm}$, and the DC voltage $V_{dc}$, and calculates each value by referring to the map data. The calculated q-axis current command value $i_{q2}^*$ is outputted to the first torque command value calculator 803 and the d-axis current command value $i_{d1}^*$, and the f-axis current command value $i_{f1}^*$ are outputted to the magnetic flux estimator 802.

Figure 9:
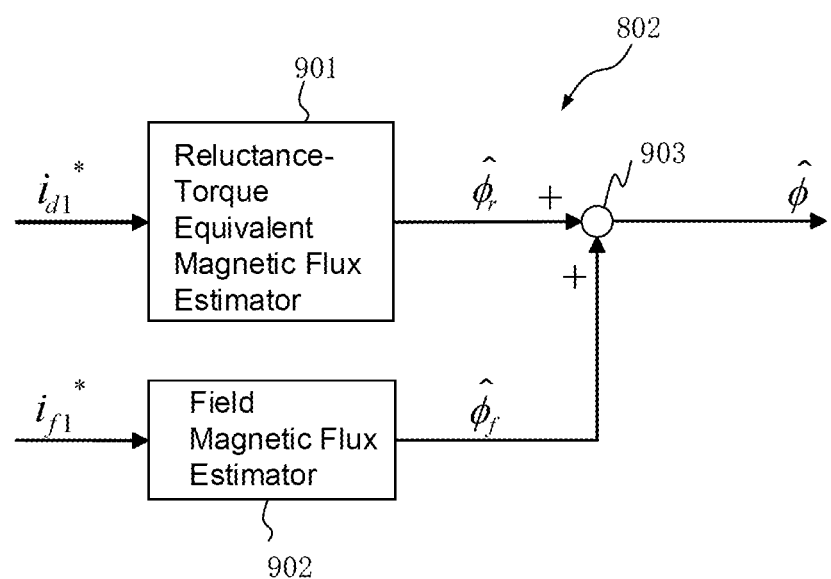
FIG. 9 illustrates a block diagram of a magnetic flux estimate unit.

FIG. 9 illustrates a control block diagram of the magnetic flux estimator 802. The magnetic flux estimator 802 includes a reluctance torque equivalent magnetic flux estimator 901, a magnetic flux estimator 902, and an adder 903.

The reluctance torque equivalent magnetic flux estimator 901 calculates the reluctance torque equivalent magnetic flux estimate value $\varphi r\hat{}$ using the d-axis current command value $i_{d1}^*$ as the input. The magnetic flux estimator 902 calculates the magnetic flux estimate value $\varphi f\hat{}$ using the f-axis current command value $i_{f1}^*$ as the input. Then, the adder 903 calculates the magnetic flux estimate $\varphi\hat{}$ by adding together the reluctance torque equivalent magnetic flux estimate value $\varphi r\hat{}$ and the magnetic flux estimate value $\varphi f\hat{}$.

Figure 10:
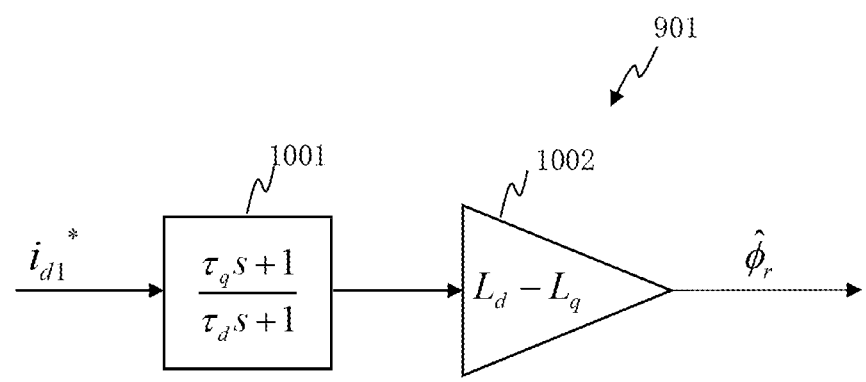
FIG. 10 illustrates a block diagram of a reluctance-torque equivalent flux estimator of the first embodiment.

FIG. 10 illustrates the control block diagram of the reluctance torque equivalent magnetic flux estimator 901. The reluctance torque equivalent magnetic flux estimator 901 is composed of a phase-advancing compensator 1001 and a multiplier 1002.

The phase-advancing compensator 1001 has a calculation function for a transmission characteristic $(\tau_q s+1)/(\tau_d s+1)$, whereby the transmission characteristic of the primary delay (d-axis current transmission characteristic (see the control block 601) formed by simulating the d-axis current response delay is phase-advancing compensated by the q-axis current response. The phase-advancing compensator 1001 obtains the value by applying the phase-advancing compensation to the d-axis current command value $i_{d1}^*$ using the transmission characteristics $(\tau_q s+1)/(\tau_d s+1)$, and outputs the obtained value to the multiplier 1002.

The multiplier 1002 calculates the reluctance torque equivalent magnetic flux estimate $\varphi r\hat{}$ by multiplying the output of the phase-advancing compensator 1001 by the difference $L_d-L_q$ between the d-axis inductance $L_d$ and the q-axis inductance $L_q$. For the d-axis inductance $L_d$ and q-axis inductance $L_q$, the values at any operating point (representative operating point) of the motor 4 may be used, or the values may be obtained with reference to the map data stored in advance. The reluctance torque generated in the rotor by the dq axis current $i_d$ and $i_q$ are represented by the following equation (17). Therefore, the item $(L_d-L_q)i_d$ in the equation (17) below can be defined as the reluctance torque equivalent magnetic flux. Note that $p_n$ is a pole number, e.g. the number of poles provided in the motor 4.

[Equation 17]

$$p_n(L_d-L_q)i_d i_q \quad (17)$$

The oscillation suppression calculation processing unit 2b uses the reluctance torque equivalent magnetic flux estimate value $\varphi r\hat{}$, where the q-axis current response is phase advancing compensated by the phase-advancing compensator 1001, such that the q-axis current response delay has been taken into consideration. With such calculation the q-axis current command value (second q-axis current command value) $i_{q2}^*$ can be calculated.

Figure 11:
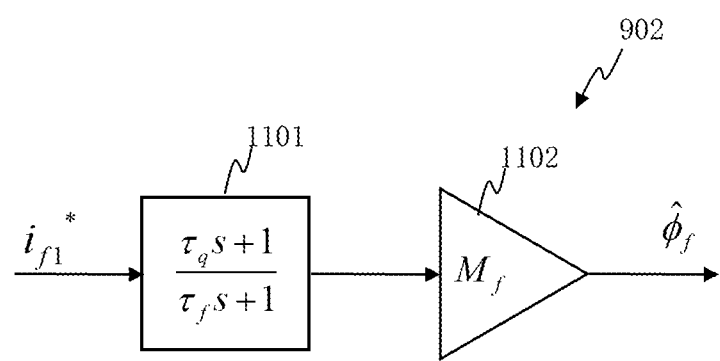
FIG. 11 illustrates a block diagram of a reluctance-torque equivalent flux estimator of the first embodiment.

FIG. 11 shows the control block diagram of the magnetic flux estimator 902. The magnetic flux estimator 902 includes a phase advancing compensator 1101 and a multiplier 1102.

The phase advancing compensator 1101 has a calculation function for the transmission characteristic $(\tau_q s+1)/(\tau_f s+1)$, where the q-axis current response is phase advancing compensated for the transmission characteristic of the primary delay (see the control block 701) formed by simulating the f-axis current response delay. The phase advancing compensator 1101 obtained by applying the phase advancing compensation using the transmission characteristics $(\tau_q s+1)/(\tau_f s+1)$ to the f-axis current command value $i_{f1}^*$, and outputs the obtained value to the multiplier 1102.

The multiplier 1102 calculates the magnetic flux estimate value $\varphi f\hat{}$ by multiplying the output of the phase advancing compensator 1101 by the mutual inductance $M_f$ between the stator and the rotor. For the mutual inductance $M_f$, a value at any operating point (representative operating point) of the motor 4 may be used, or it may be determined by referring to the map data stored in advance.

In the oscillation suppression calculation processing unit 2b, the q-axis current command value $i_{q2}^*$, with taking into consideration of the q-axis current response delay, can be calculated by using the magnetic flux estimate $\varphi f\hat{}$ where the q-axis current response advancing compensation is performed by the phase advancing compensator 1101. Hereinafter, the explanation will be continued referring back to FIG. 8.

The first torque command value calculator 803 calculates the first torque command value (torque command value before oscillation suppression) $T_{m1}^*$ by multiplying three of the q-axis current command value $i_{q2}^*$, the magnetic flux estimate $\varphi\hat{}$, and the poles number $p_n$ of the motor 4. The calculated first torque command value $T_{m1}^*$ is outputted to the second torque command value calculator 804.

The second torque command value calculator 804 performs a so-called oscillation suppression control, which removes the natural oscillation frequency component of the vehicle's drive shaft torque transmission system, using the following equation (18) for the first torque command value $T_{m1}^*$, thereby calculating the command value (final torque command value) $T_{m2}^*$.

[Equation 18]

$$T_{m2}^* = G_{INV}(s) \cdot T_{m1} \quad (18)$$

The derivation of the filter (transmission function) $G_{inv}(s)$ that removes the natural oscillation frequency component of the drive shaft torque transmission system of the vehicle will be described. First, the equation of motion of the vehicle will be described referring to FIG. 12.

Figure 12:
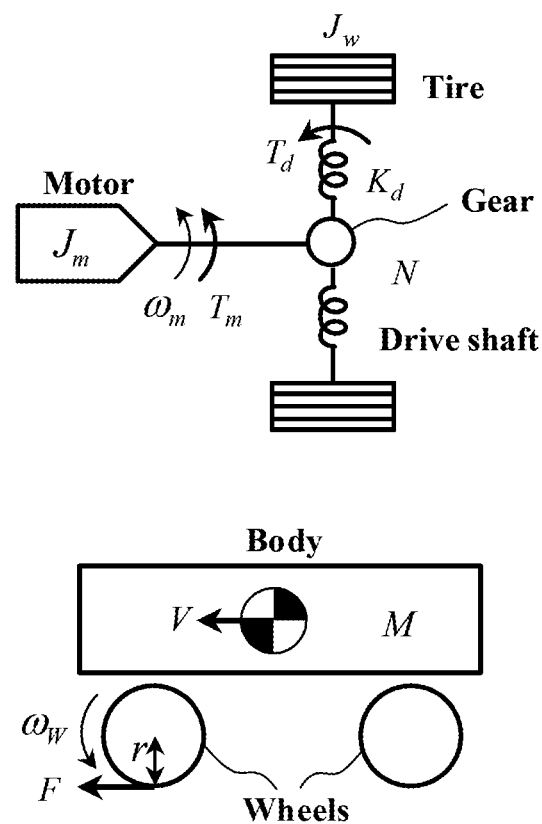
FIG. 12 illustrates a figure illustrating the equation of motion of the electric vehicle.

FIG. 12 is the diagram in which the driving force transmission system of the vehicle is modeled to be a control block 601, and each parameter in the figure is shown below.
$J_m$: Motor inertia
$J_w$: Drive wheel inertia (for 1 axis)
M: Vehicle mass
$K_d$: Torsional rigidity of drive shaft (axel shaft)
$K_t$: Coefficients for friction between tires and road surfaces
$N_{at}$: Overall gear ratio
r: Tire load radius
$\omega_m$: Motor angular velocity
$\omega_w$: Drive wheel angle speed
$T_m$: Motor torque
$T_d$: Drive shaft torque
F: Driving force (2 axes)
V: Vehicle speed The following equations of motion equations from (19) to (23) can be derived from FIG. 12.

[Equation 19]
$$J_m \dot{\omega}_m = T_m - T_d / N_{al} \quad (19)$$

[Equation 20]
$$2 J_w \dot{\omega}_w = T_d - rF \quad (20)$$

[Equation 21]
$$M \dot{V} = F \quad (21)$$

[Equation 22]
$$T_d = K_d \int \left( \frac{\omega_m}{N_{al}} - \omega_w \right) dt \quad (22)$$

[Equation 23]
$$F = K_t \cdot (r\omega_m - V) \quad (23)$$

When the above equations from (19) to (23) are transformed with Laplace transformation and the transmission characteristic from the motor torque $T_m$ to the motor angle speed $\omega_m$ are determined, they can be expressed by the following equations (24) and (25).

[Equation 24]
$$\omega_m = G_p(s) \cdot T_m \quad (24)$$

[Equation 25]
$$G_p(s) = \frac{1}{s} \cdot \frac{b_3 s^3 + b_2 s^2 + b_1 s + b_0}{a_3 s^3 + a_2 s^2 + a_1 s + a_0} \quad (25)$$

Where $a_3$, $a_2$, $a_1$, $a_0$, $b_3$, $b_2$, $b_1$, and $b_0$ in the equations (24) and (25) are represented by the following equation (26), respectively.

[Equation 26]

$a_3 = 2 J_m J_w M$ $a_2 = K_t J_m (2 J_w + r^2 M)$ $a_1 = K_d M (J_m + 2 J_w / N^2)$ $a_0 = K_d K_t (J_m + 2 J_w / N^2 + r^2 M / N^2)$ $b_3 = 2 J_w M$ $b_2 = K_t (2 J_w + r^2 M)$ $b_1 = K_d M$ $b_0 = K_d K_t \quad (26)$ When the equation (25) is arranged and simplified, $G_p(s)$ can be expressed as the following equation (27), where, $\zeta_p$ and $\omega_p$ in the equation (27) are a suppression coefficient and an inherent oscillation frequency of the drive shaft torsional oscillation system, respectively.

[Equation 27]
$$G_p(s) = \frac{1}{s} \cdot \frac{(s + \beta) \cdot (b_2' s^2 + b_1' s + b_0')}{(s + \alpha) \cdot (s^2 + 2 \zeta_p \omega_p s + \omega_p^2)} \quad (27)$$

If the ideal model $G_m(s)$ indicating the response target of the motor rotation speed to the inputted torque is set to the vehicle in the following equation (28), the transmission function $G_{inv}(s)$ can be represented by the following equation (29), where, $\zeta_m$ and $\omega_m$ in the equations (28), (29) are the suppression coefficient and the inherent oscillation frequency of the drive shaft torsional oscillation system, respectively.

[Equation 28]
$$G_m(s) = \frac{1}{s} \cdot \frac{(s + \beta) \cdot (b_2' s^2 + b_1' s + b_0')}{(s + \alpha) \cdot (s^2 + 2 \zeta_m \omega_m s + \omega_m^2)} \quad (28)$$

[Equation 29]
$$G_{INV}(s) = \frac{G_m(s)}{G_p(s)} = \frac{s^2 + 2 \zeta_p \omega_p s + \omega_p^2}{s^2 + 2 \zeta_m \omega_m s + \omega_m^2} \quad (29)$$

In addition, the known method disclosed in JP5900609B can be also applied to the oscillation suppression process of this embodiment as the method of removing the natural oscillation frequency component of the drive shaft torque transmission system of the vehicle by adjusting the natural oscillation frequency component in consideration of the influence of a backlash of gears in situations where the vehicle accelerates from a coast stop or deceleration, In addition, the second q-axis current command value calculator 805 shown in FIG. 8 takes the second torque command value $T_{m2}^*$ outputted from the second torque command value calculator 804 and the magnetic flux estimate $\hat{\varphi}$ outputted from the magnetic flux estimator 802 as the inputs. Later, the second q-axis current command value calculator 805 calculates the q-axis current command value (second q-axis current command value) $i_{q2}^*$ by using the following equation (30). The calculated q-axis current command value $i_{q2}^*$ is inputted to the q-axis current control unit 406 of the current control calculation processing unit 2a shown in FIG. 4. As described above, the magnetic flux estimate $\hat{\varphi}$ is calculated based on the d-axis current command value $i_{d1}^*$ set according to the torque command value $T_m^*$ based on the vehicle information and the f-axis current command value $i_{f1}^*$. In other words, the q-axis current command value $i_{q2}^*$ of the present embodiment is calculated by compensating the q-axis current command value $i_{q2}^*$ set for the torque command value $T_m^*$, taking into account the d-axis current command value $i_{d1}^*$ and the f-axis current command value $i_{f1}^*$. As the result, the oscillation suppression calculation processing unit 2b can suppress the torsional oscillation of the drive shaft torque transmission system in consideration of the influence of the reluctance torque generated for the d-axis current command value $i_{d1}^*$ and the magnetic flux generated for the f-axis current command value $i_n^*$.

[Equation 30]

$$i_{q2}^* = T_{m2}^*/(p_n \cdot \hat{\varphi}) \tag{30}$$

In the following statements referring to FIG. 13, the effect by the control method (oscillation suppression processing) of the electric vehicle of the first embodiment described above will be explained.

Figure 13:
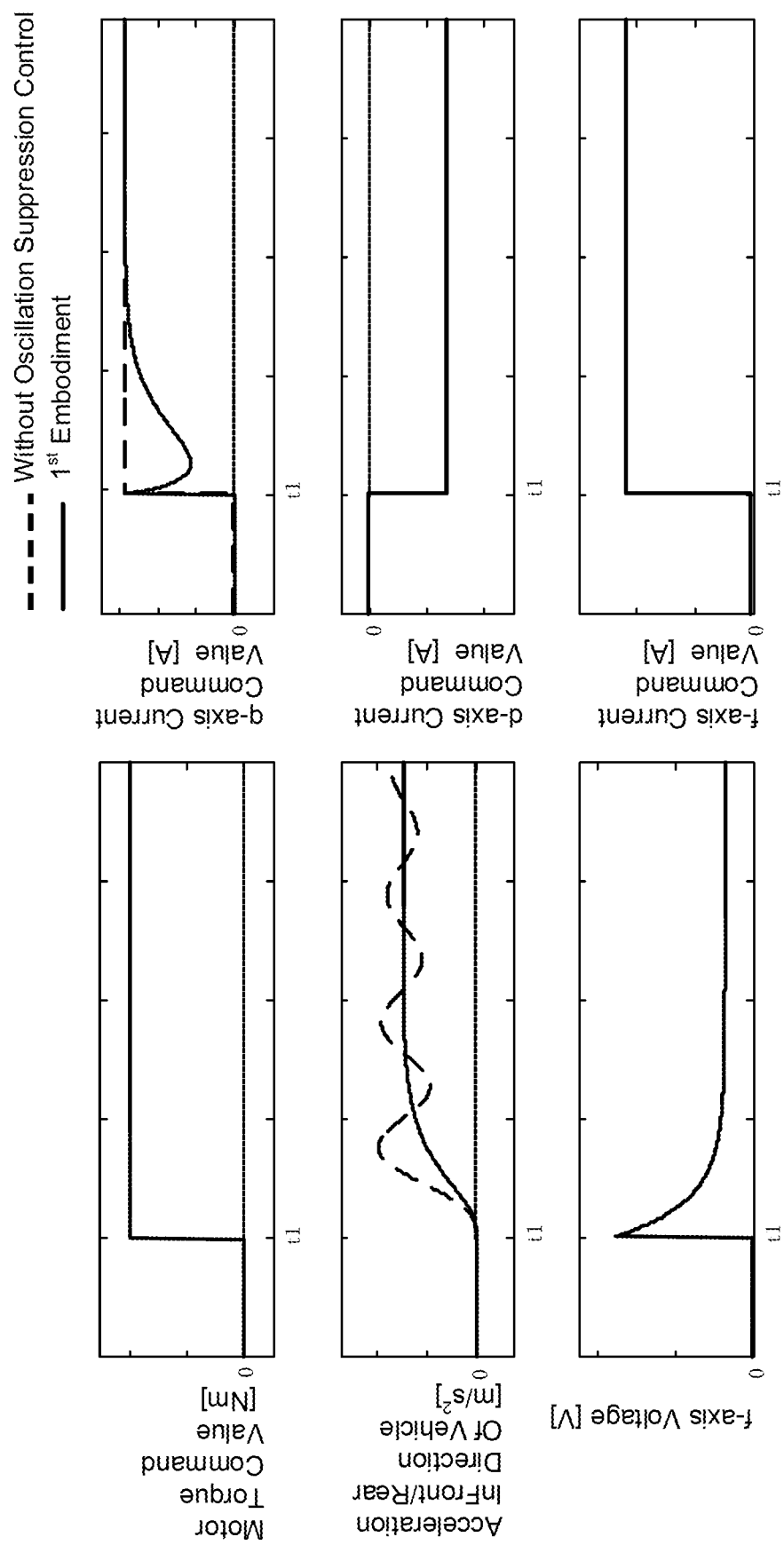
FIG. 13 illustrates a time chart showing control results by the control method of the electric vehicle of the first embodiment.

FIG. 13 is the time chart showing the control results of the present embodiment. The horizontal axis represents time, and the vertical axis represents the motor torque command value [Nm], the vehicle's forward and backward acceleration [m/s2], and the f-axis voltage [V] in the order from top left, and the q-axis current command value [A], the d-axis current command value [A], and the f-axis current command value [A] in the order from top right. The solid lines in the figure show the present embodiment, and the dotted lines show the control by the conventional technique (conventional example).

FIG. 13 represents a scene when the motor torque command value is changed in a step shape accelerated (rising) at the time t1 from the state in which the vehicle stopped.

In the control of the present embodiment in this time chart, the f-axis current normative response time constant (see the control block 701 ($\tau_f$)) is set to the value where f-axis voltage saturation does not occur. When this embodiment is applied, since the motor torque that suppresses drive shaft torsional oscillation is realized (see FIG. 8) by the q-axis current command value $i_{q2}^*$ calculated taking into account the d-axis current $i_d$ and the f-axis current, the acceleration oscillation in front and the rear of the vehicle is suppressed as shown by the solid lines in the figure.

On the other hand, in the conventional control method, since the f-axis current is not considered when the q-axis current command value is calculated, the drive shaft torsional oscillation is generated, and the acceleration oscillation in the direction of front/rear of the vehicle is generated as shown by the dotted lines.

As described above, the control method of the electric vehicle of the first embodiment is the control method for controlling the currents of the electric vehicle driven by the field magnet winding type synchronous motor 4 having the stator winding through which the stator current flows and the rotor winding through which the rotor current flows. In this control method, the basic torque command value $T_m^*$ is set based on the vehicle information. The d-axis current command value $i_{d1}^*$, the first q-axis current command value $i_{q2}^*$ for the stator current, and the f-axis current command value $i_{f1}^*$ for the rotor current are calculated based on the basic command value and the vehicle information. The estimated flux value $\hat{\varphi}$, which is the estimated value of magnetic flux generated in the rotor, is calculated based on the d-axis current command value $i_{d1}^*$ and the f-axis current command value $i_{f1}^*$. Then, the final torque command value $T_{m2}^*$ is calculated based on the first q-axis current command value $i_{q2}^*$ and the estimated flux value $\hat{\varphi}$, and the second q-axis current command value $i_{q2}^*$ is calculated based on the magnetic flux estimate $\hat{\varphi}$ and the final torque command value $T_{m2}^*$. The stator current and the rotor current are controlled based on the second q-axis current command value $i_{q2}^*$, the d-axis current command value $i_{d1}^*$, and the f-axis current command value $i_{f1}^*$. This allows the second q-axis current command value $i_{q2}^*$ to be calculated in consideration of the d-axis current command value $i_{d1}^*$ and the f-axis current command value $i_{f1}^*$, such that it is possible to apply oscillation suppression control to suppress torsional oscillation in the drive shaft torque transmission system of the electric vehicle using the field magnet winding type synchronous motor 4 as the drive source, taking into consideration of the effect of the reluctance torque generated by the d-axis current command value $i_{d1}^*$ and the magnetic flux generated by the f-axis current command value $i_{f1}^*$.

Further, according to the control method of the electric vehicle of the first embodiment, the final torque command value $T_{m2}^*$ can be calculated by applying oscillation suppression control to suppress torsional oscillation of the drive shaft torque transmission system using the filter $G_{inv}(s)$ that removes the natural oscillation frequency components of the drive shaft torque transmission system of the electric vehicle for the torque command value $T_{m1}^*$ before the oscillation suppression, which is calculated based on the first q-axis current command value $i_{q2}^*$ and the magnetic flux estimate value $\hat{\varphi}$. This allows applying oscillation suppression control that suppresses the torsional oscillation of the drive shaft torque transmission system of the electric vehicle, so that it is possible to suppress the generation of torsional oscillation of the drive shaft torque transmission system of the electric vehicle using the field magnet winding type synchronous motor 4 as the driving source.

In addition, according to the control method of the electric vehicle of the first embodiment, the second q-axis current command value $i_{q2}^*$ is calculated by dividing the final torque command value $T_{m2}^*$ by the magnetic flux estimate $\hat{\varphi}$. Thereby, the q-axis current command value $i_{q2}^*$ that realizes the final torque command value $T_{m2}^*$ applied to oscillation control can be calculated.

Furthermore, according to the control method of the electric vehicle of the first embodiment, the field magnetic flux estimate value $\hat{\varphi f}$, which is the estimated value of the magnetic flux of the rotor, is calculated based on the f-axis current command value $i_{f1}^*$, the equivalent magnetic flux estimate value $\hat{\varphi r}$ of the reluctance torque generated in the rotor based on the d-axis current command value $i_{d1}^*$ is calculated, and the magnetic flux estimate $\hat{\varphi}$ is calculated by adding together the magnetic flux estimate $\hat{\varphi f}$ and the equivalent magnetic flux estimate value $\hat{\varphi r}$. Thereby, considering the influence of the d-axis current $i_d$ and the f-axis current $i_f$, the q-axis current command value $i_{q2}^*$ that realizes the final torque command value $T_{m2}^*$ applied to the oscillation suppression control can be calculated.

In addition, according to the control method of the electric vehicle of the first embodiment, the magnetic flux estimate $\hat{\varphi}$ is calculated using the configured transmission characteristics (the control block 1101) to phase-advancing compensate the q-axis current response for the f-axis current command value $i_{f1}^*$ of the f-axis current $i_f$ that constitutes the rotor current for. Thereby, the q-axis current command value $i_{q2}^*$, where the q-axis current response delay for the d-axis current $i_d$ is taken into consideration can be calculated.

Furthermore, the control method of the electric vehicle of the first embodiment has the function of the f-axis current transmission characteristic for calculating the transmission's primary delay. Thereby, the f-axis current response which does not cause an f-axis voltage saturation can be appropriately simulated.

In addition, according to the control method of the electric vehicle of the first embodiment, the equivalent magnetic flux estimate φr^ can be calculated by using the transmission characteristic constituted for performing phase-advancing compensation of the q-axis current response for the d-axis current transmission characteristic that simulates the response delay for the d-axis current command value of the d-axis current $i_d$ that constitutes the rotor current. Thereby the q-axis current command value in consideration of the q-axis current delay for the f-axis current $i_f$ can be calculated.

Second Embodiment

The second embodiment of the control method for the electric vehicle will be described. In the first embodiment, the method was explained that when the non-interference control by the non-interference control unit 405 functions ideally, the d-axis, q-axis, and f-axis voltage-to-current characteristics show the primary delay as shown in Equations (4), (5), and (6) above, respectively. However, when the f-axis voltage has been saturated, the f-axis current response does not match the normative response of the primary delay. The control method of the electric vehicle of this embodiment is the control method applied on the presumption that the f-axis current $i_f$ is controlled in consideration of the f-axis voltage saturation, and in particular, the configuration of a magnetic flux estimator 802 provided by the oscillation suppression calculation processing unit 2b differs from the first embodiment.

Prior to the description of the magnetic flux estimator 802 of this embodiment, the method of controlling the f-axis current $i_f$ will be described in consideration of the f-axis voltage saturation. Since the controls on the d-axis and q-axis are the same as that on the f-axis, the explanations for the d-axis and q-axis are omitted, and only the control on the f-axis will be explained below.

Figure 14:
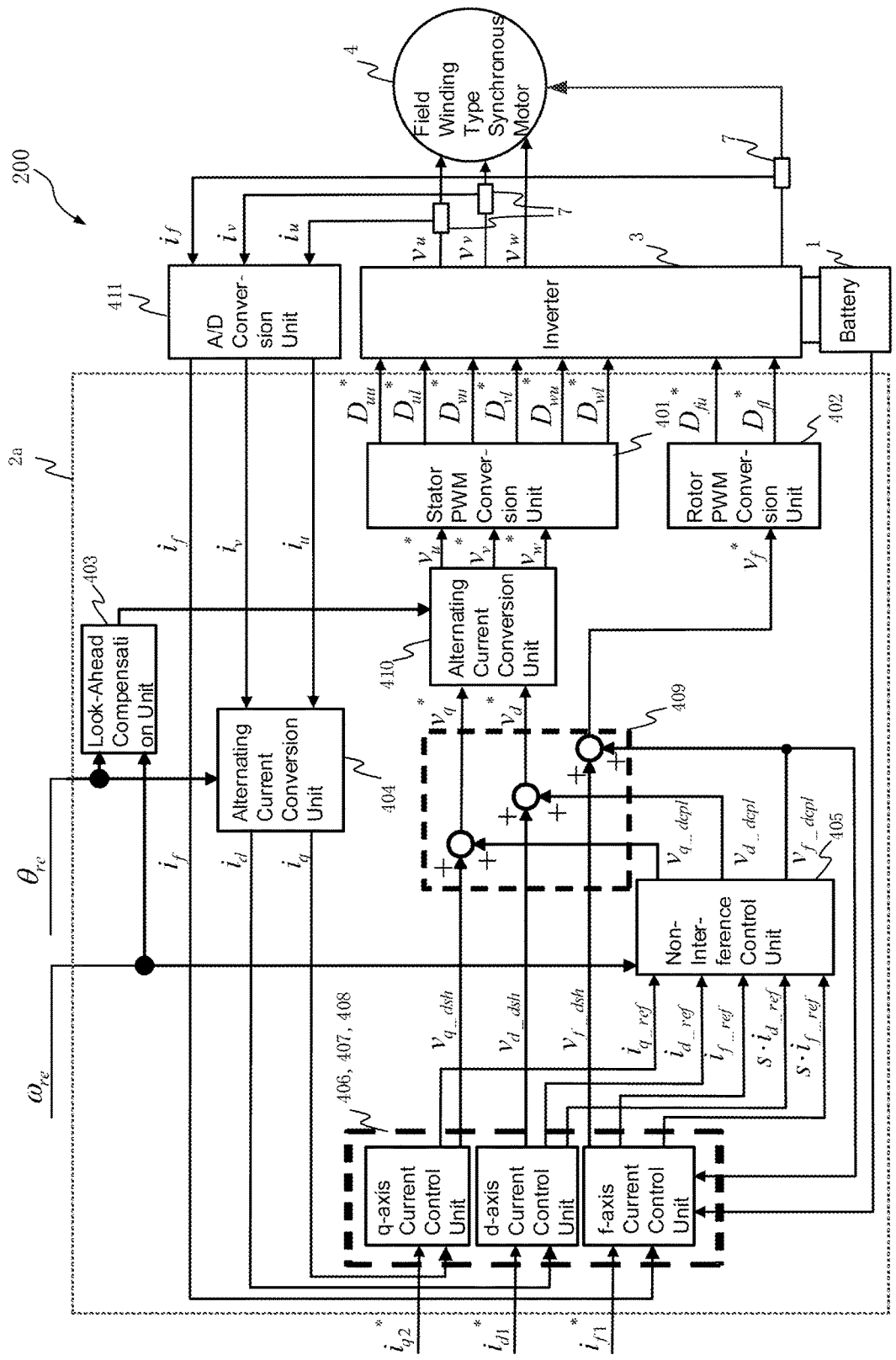
FIG. 14 illustrates a block diagram of a motor control system of a second embodiment.

FIG. 14 illustrates the example of the configuration of the motor control system 200 of the second embodiment. The motor control system 200 of this embodiment differs from the first embodiment in that the power supply voltage $V_{dc}$ of the battery 1 and the non-interference voltage $V_{f\_dcpl}$, which is the output of the non-interference control unit 405, are inputted to the f-axis current control unit 408.

Figure 15:
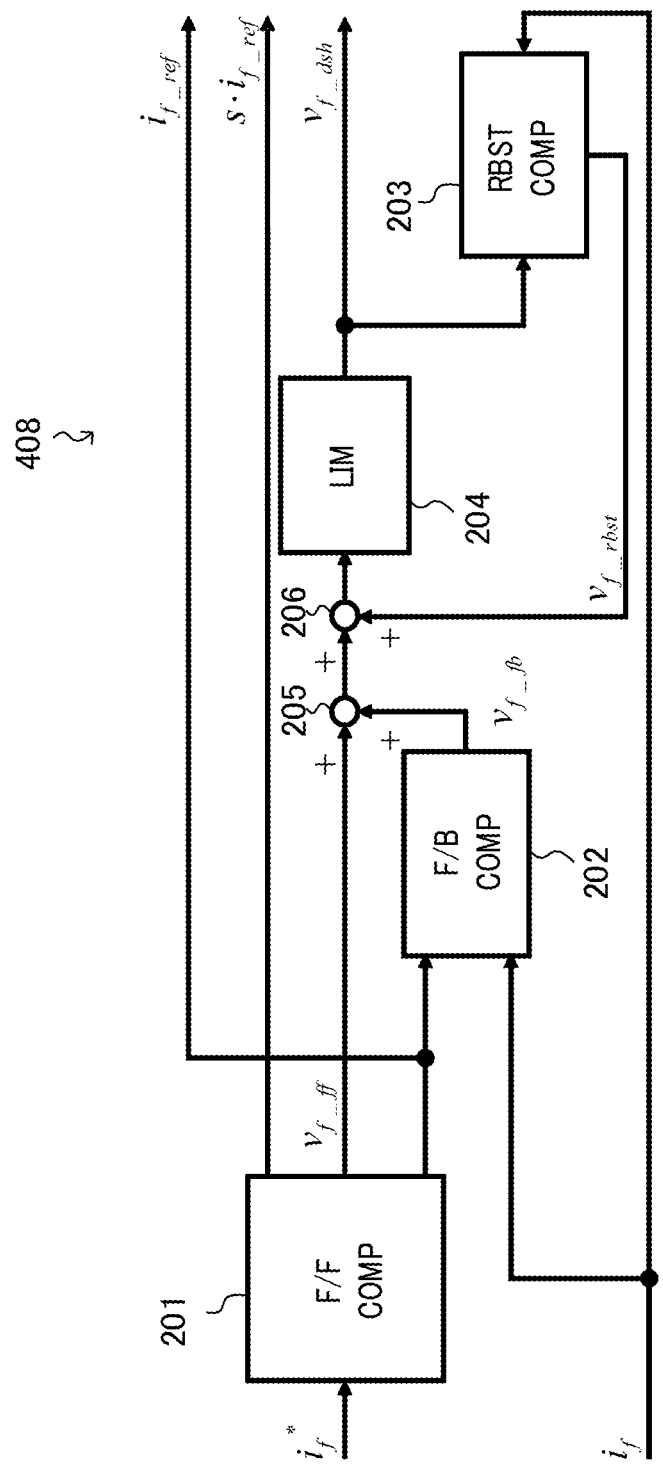
FIG. 15 illustrates a block diagram of a f-axis current control unit.

The details of the f-axis current control unit 408 will be described using FIG. 15. FIG. 15 illustrates a control block diagram of the f-axis current control unit 408.

In the f-axis current control unit 408, the first f-axis voltage command value $v_{f\_dsh}$ is calculated so that the f-axis current $i_f$ inputted from the A/D converter 411 follows the f-axis current command value $i_f$ with a desired responsiveness without steady deviation. Further, the f-axis current control unit 408 calculates the f-axis current normative response $i_{f\_ref}$ and the f-axis current normative response derivative value $s \cdot i_{f\_ref}$, which are used in later processing.

The f-axis current control unit 408 includes an f-axis F/F (feed-forward) compensator 201, an f-axis F/B compensator 202, an f-axis robust compensator 203, and an f-axis limit processing unit 204, each of which will be described in detail below.

The f-axis F/F compensator 201 takes the f-axis current command value $i_{f*}$ as the input and calculates, in addition to the f-axis F/F compensation voltage $v_{f\_ff}$, the f-axis current normative response $i_{f\_ref}$ and the f-axis current normative response derivative value $s \cdot i_{f\_ref}$. The f-axis F/F compensator 201 outputs the f-axis current normative response $i_{f\_ref}$ and the f-axis current normative response derivative value $s \ i_{f\_ref}$ to the non-interference control unit 405, and also outputs the f-axis current normative response $i_{f\_ref}$ to the f-axis F/B compensator 202. The details of the f-axis F/F compensator 201 will be described later using FIG. 16. Although not shown in the figure, the power supply voltage $V_{dc}$ outputted from the battery 1 and the non-interference voltage $V_{f\_dcpl}$ are inputted to the f-axis F/F compensator 201.

The f-axis F/B compensator 202 is a compensator that performs general feedback compensation. The f-axis F/B compensator 202 performs F/B processing to negatively feedback the f-axis current when measured by the current sensor 7 to the f-axis current normative response if ref calculated in the f-axis F/F compensator 201, and calculates the f-axis F/B compensation voltage $v_{f\_fb}$. The f-axis F/B compensator 202 outputs the f-axis F/B compensation voltage $v_{f\_fb}$ to the adder 205. The details of the f-axis F/B compensator 202 will be described later using FIG. 21. The f-axis F/B compensator 202 is an example of the block that performs the F/B compensation step.

The f-axis robust compensator 203 calculates, based on the first f-axis voltage command value $v_{f\_dsh}$ calculated in the f-axis limit processing unit 204 described below and finally outputted from the f-axis current control unit 408 and the f-axis current $i_f$, the f-axis robust compensation voltage $v_{f\_rbst}$ to ensure the robustness of the system. The f-axis robust compensator 203 outputs the f-axis robust compensation voltage $v_{f\_rbst}$ to the adder 206. The details of the f-axis robust compensator 203 will be described later using FIG. 22.

The two adders 205 and 206 are provided in the former stage of the f-axis limit processing unit 204. The f-axis F/B compensation voltage $v_{f\_fb}$ is added to the f-axis F/F compensation voltage $v_{f\_ff}$ calculated in the f-axis F/F compensator 201 by the adder 205, and further, the f-axis robust compensation voltage $v_{f\_rbst}$ is added by the adder 206. The final added value is then inputted to the f-axis limit processing unit 204. Accordingly, the f-axis limit processing unit 204 takes the values calculated by adding the sum of the f-axis F/B compensation voltage $v_{f\_fb}$, which is the F/B compensation value, and the f-axis robust compensation voltage $v_{f\_rbst}$, which is the F/B robust compensation value to the f-axis F/F compensation voltage $v_{f\_ff}$, which is the F/F command value.

Then, the f-axis limit processing unit 204 limits the input voltage command value and calculates the first f-axis voltage command value $v_{f\_dsh}$. The f-axis limit processing unit 204 outputs the f-axis voltage command value $v_{f\_dsh}$ to the voltage command value calculation unit 409 and the f-axis robust compensator 203. In the f-axis limit processing unit 204, the same processing is performed as in an f-axis limit processing unit 303 described below using FIGS. 19 and 20.

Figure 16:
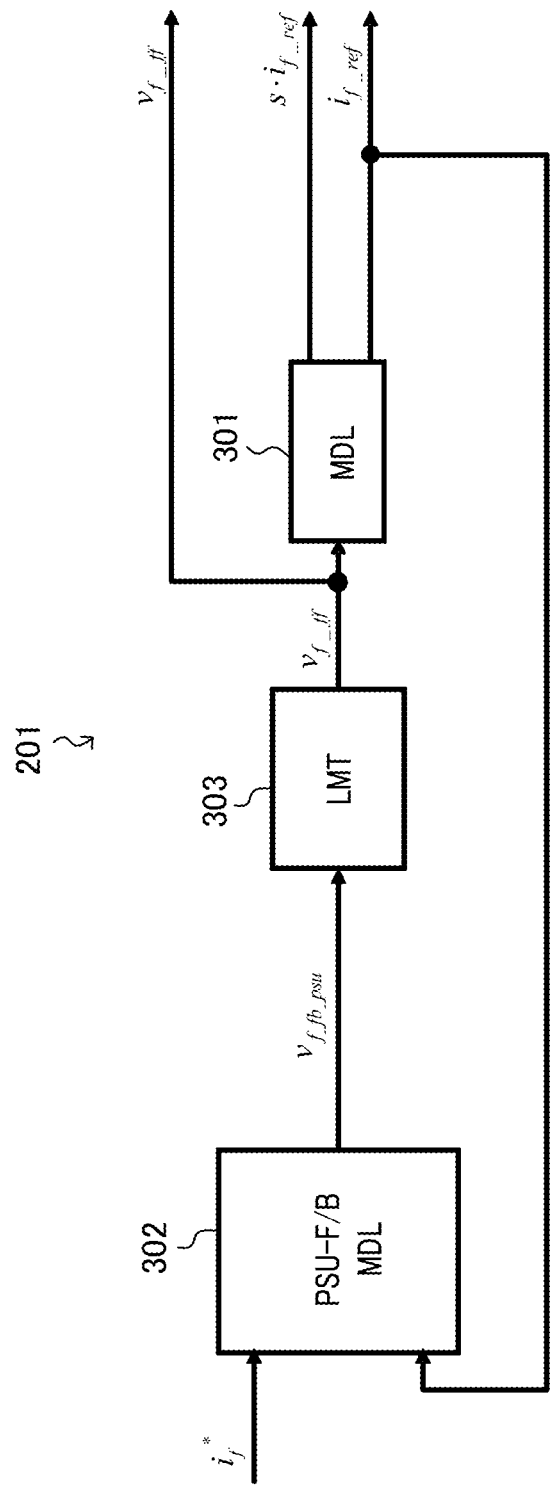
FIG. 16 illustrates a block diagram of a f-axis F/F compensator.

Next, the detailed configuration of the f-axis F/F compensator 201 will be described using FIG. 16. FIG. 16 illustrates a detailed block diagram of the f-axis F/F compensator 201. The f-axis F/F compensator 201 has an f-axis current model 301, an f-axis current pseudo-F/B model 302, and the f-axis limit processing unit 303.

The f-axis current model 301 is a filter that models the normative response characteristics from the f-axis voltage to the f-axis current. The f-axis current model 301 calculates the f-axis current normative response $i_{f\_ref}$, which is the normative response, by filtering processing using the normative response model from the voltage to the current in the f-axis for f-axis compensation voltage $v_{f\_ff}$ outputted from the f-axis limit processing unit 303 described later, and outputs the response to the f-axis F/B compensator 202. The f-axis current model 301 also outputs the f-axis current normative response derivative value s $i_{f\_ref}$, which is the derivative of the f-axis current normative response $i_{f\_ref}$, to the non-interference control unit 405 for use in later processing. The details of the f-axis current model 301 will be described later using FIG. 17.

In the f-axis current pseudo-F/B model 302, the f-axis current normative response $i_{i\_ref}$ outputted from the f-axis current model 301 is negatively fed back to the f-axis current command value $i_f^*$ calculated by the current command value calculator 113. The f-axis current pseudo-F/B model 302 calculates the pseudo-FB voltage command value $v_{f\_pse\_fb}$ in order to make the f-axis current normative response $i_{i\_ref}$ follow the f-axis current command value $i_f^*$ with the desired responsiveness without steady deviation, and outputs the value to the f-axis limit processing unit 303. The details of the f-axis current pseudo-F/B model 302 will be described later using FIG. 18.

The f-axis limit processing unit 303 limits the pseudo-FB voltage command value $v_{f\_pse\_fb}$ outputted from the f-axis current pseudo-F/B model 302, calculates the f-axis F/F compensation voltage $v_{f\_ff}$, and outputs the value to the adder 205 and the f-axis current model 301. The details of the f-axis limit processing unit 303 will be described later using FIGS. 19 and 20.

Although not shown in the figures, the power supply voltage $V_{dc}$ outputted from the battery 1 and the non-interference voltage $V_{f\_dcpl}$ outputted from the non-interference control unit 405 are inputted to the f-axis limit processing unit 303. As shown in FIG. 15, the f-axis F/F compensation voltage $v_{f\_ff}$ outputted from the f-axis limit processing unit 303 passes through the adder 205, the adder 206, and the f-axis limit processing unit 204 to calculate the first f-axis voltage command value $v_{f\_dsh}$. In other words, the combination of the adder 205, the adder 206, and the f-axis limit processing unit 204 are examples of the sets constituting the block configuration that executes the first f-axis voltage command value calculation step.

Therefore, in the f-axis F/F compensator 201, a F/B system in which the measured f-axis current $i_f$ is negatively fed back is not provided, but a pseudo-F/B model in which the f-axis current normative response $i_{f\_ref}$ calculated in the f-axis current model 301 is negatively fed back for the f-axis current pseudo-F/B model 302 is provided. By realizing the pseudo-F/B system in this way, a F/B control with poor response can be avoided, thus the responsiveness is improved.

Furthermore, as shown in FIG. 14, since the f-axis voltage $v_f$ is generated by the battery 1, the upper limit of the f-axis voltage $v_f$ is limited and saturated by the supply voltage $V_{dc}$ of the battery 1. Therefore, the f-axis limit processing unit 303, which models saturation at the power supply voltage $V_{dc}$, is provided to limit the first f-axis voltage command value $v_{f\_dsh}$ and calculate the f-axis F/F compensation voltage $v_{f\_ff}$. The f-axis F/F compensation voltage $v_{f\_ff}$ in which voltage saturation is taken into account is returned to the f-axis current pseudo-F/B model 302, thereby improving the accuracy of the rotation control.

Figure 17:
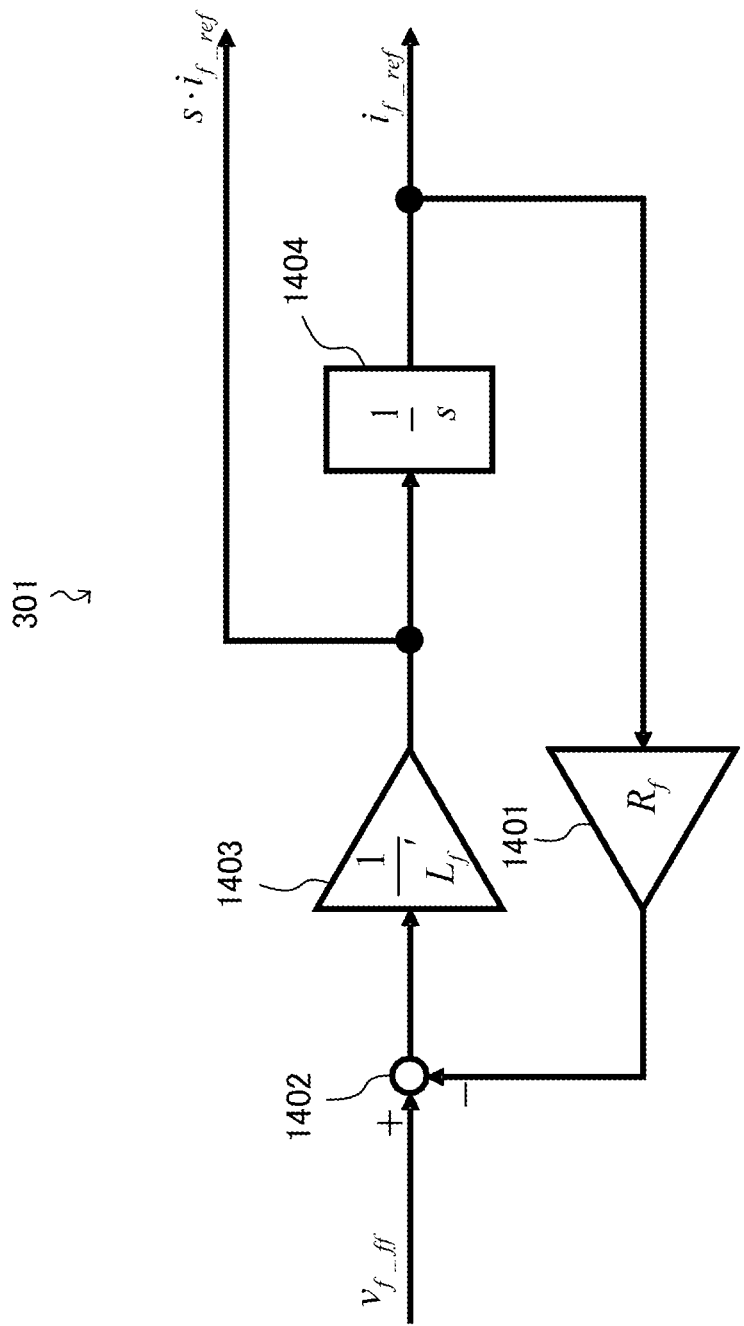
FIG. 17 illustrates a block diagram of a f-axis current model.

Next, a detailed configuration of the f-axis current model 301 will be described using FIG. 17. FIG. 17 is a detailed block diagram of the f-axis current model 301. The f-axis current model 301 has a multiplier 1401, a subtractor 1402, a divider 1403, and an integrator 1404.

The multiplier 1401 multiplies the rotor winding resistance $R_f$ by the f-axis current normative response $i_{f\_ref}$, which is one of the final outputs of the f-axis current model 301 and is output from the integrator 1404 described below, and outputs the result of the multiplication to the subtractor 1402. The result of this multiplication corresponds to the voltage value of the normative response.

The subtractor 1402 subtracts the voltage value of the normative response output from the multiplier 1401 from the f-axis F/F compensation voltage $v_{f\_ff}$ output from the f-axis limit processing unit 303, and outputs the subtracted value to the divider 1403.

The divider 1403 divides by a f-axis dynamic inductance $L_f'$ for the subtracted value calculated by the subtractor 1402, and outputs the result of the division to the non-interference control unit 405 and to the integrator 1404. In this way, the f-axis current normative response derivative value $s \cdot i_{f\_ref}$ is calculated.

The integrator 1404 calculates the f-axis current normative response $i_f$ ref by integrating the f-axis current normative response derivative value $s \; i_{f\_ref}$ output from the divider 1403, and outputs the f-axis current normative response $i_{f\_ref}$ to the non-interference control unit 405, the f-axis F/B compensator 202, and the multiplier 1401.

Therefore, in the f-axis current model 301, the f-axis current normative response $i_{f\_ref}$, which is one of the final outputs, is multiplied by the rotor winding resistance $R_f$ by the multiplier 1401 and the multiplication result is negatively fed back to the f-axis F/F compensation voltage $v_{f\_ff}$, which is used as the input. By dividing the resultant value of this negative feedback by the f-axis dynamic inductance $L_f'$ with the divider 1403, the f-axis current normative response $i_{f\_ref}$ based on the f-axis F/F compensation voltage $v_{f\_ff}$ and its derivative value $s \cdot i_{f\_ref}$ can be obtained.

Figure 18:
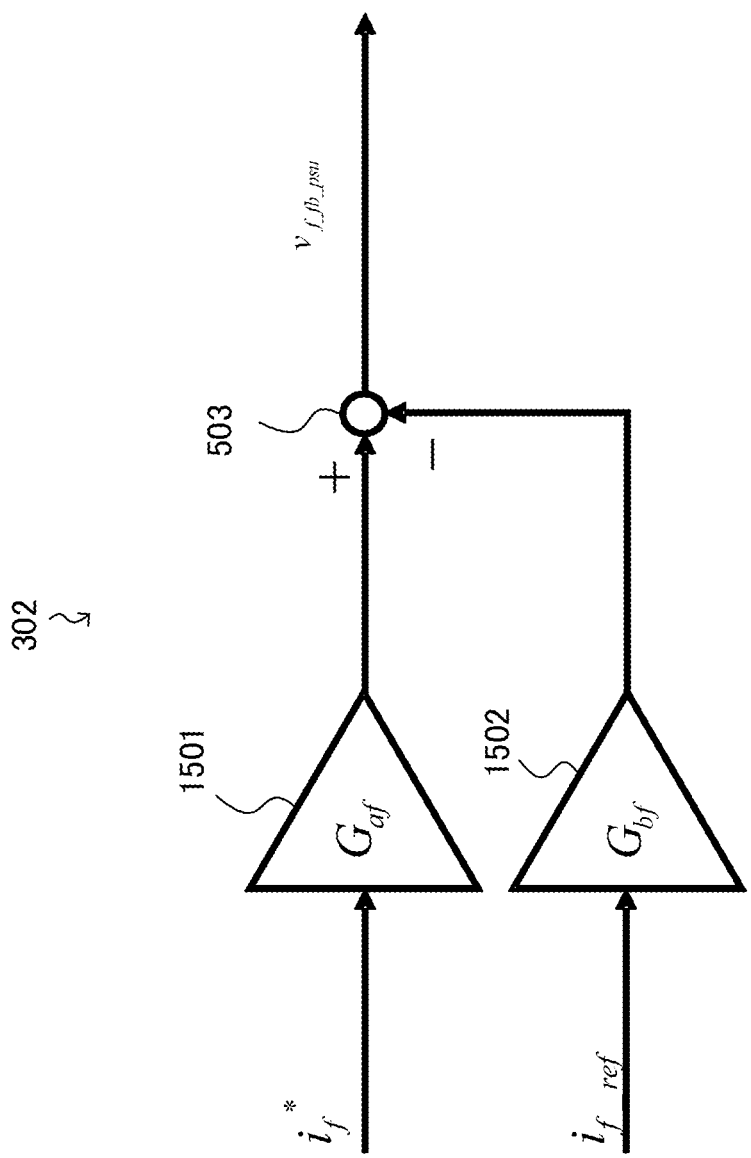
FIG. 18 illustrates a block diagram of a f-axis current F/B model.

Next, a detailed configuration of the f-axis current pseudo-F/B model 302 will be described using FIG. 18. FIG. 18 illustrates a detailed block diagram of the f-axis current pseudo-F/B model 302. The f-axis current pseudo-F/B model 302 has a filter 1501, a filter 1502, and a subtractor 1503.

The filter 1501 has the function of multiplying the f-axis current command value $i_f^*$ output from the current command value calculator 113 by a gain $G_{af}$, and outputs the filtered value to the subtractor 1503.

The filter 1502 has the function of multiplying the f-axis current normative response $i_{f\_ref}$ output from the f-axis current model 301 by a gain $G_{bf}$, and outputs the filtered value to the subtractor 1503.

The subtractor 1503 calculates the pseudo-F/B voltage command value $v_{f\_pse\_fb}$ by subtracting the output value of the filter 1502 from the output value of the filter 1501, and outputs the pseudo-FB voltage command value $v_{f\_pse\_fb}$ to the f-axis limit processing unit 303. In other words, the pseudo-F/B control is configured by the negative feedback of the f-axis current normative response $i_{f\_ref}$, which is not a measured value.

However, the gain $G_{af}$ and the gain $G_{bf}$ can be shown as the following Equation (31). The parameter $\tau_f$ represents the f-axis current control norm response time constant (f-axis current norm response time constant).

[Equation 31]

$$G_{af} = \frac{L'_f}{\tau_f}, \quad G_{bf} = \frac{L'_f - \tau_f R_f}{\tau_f} \qquad (31)$$

With this configuration described above, in the f-axis current pseudo-F/B model 302, pseudo-F/B control can be realized for the f-axis current command value $i_{f*}$ by using the f-axis current normative response $i_{f\_ref}$ as the F/B component instead of the actually measured f-axis current if.

Figure 19:
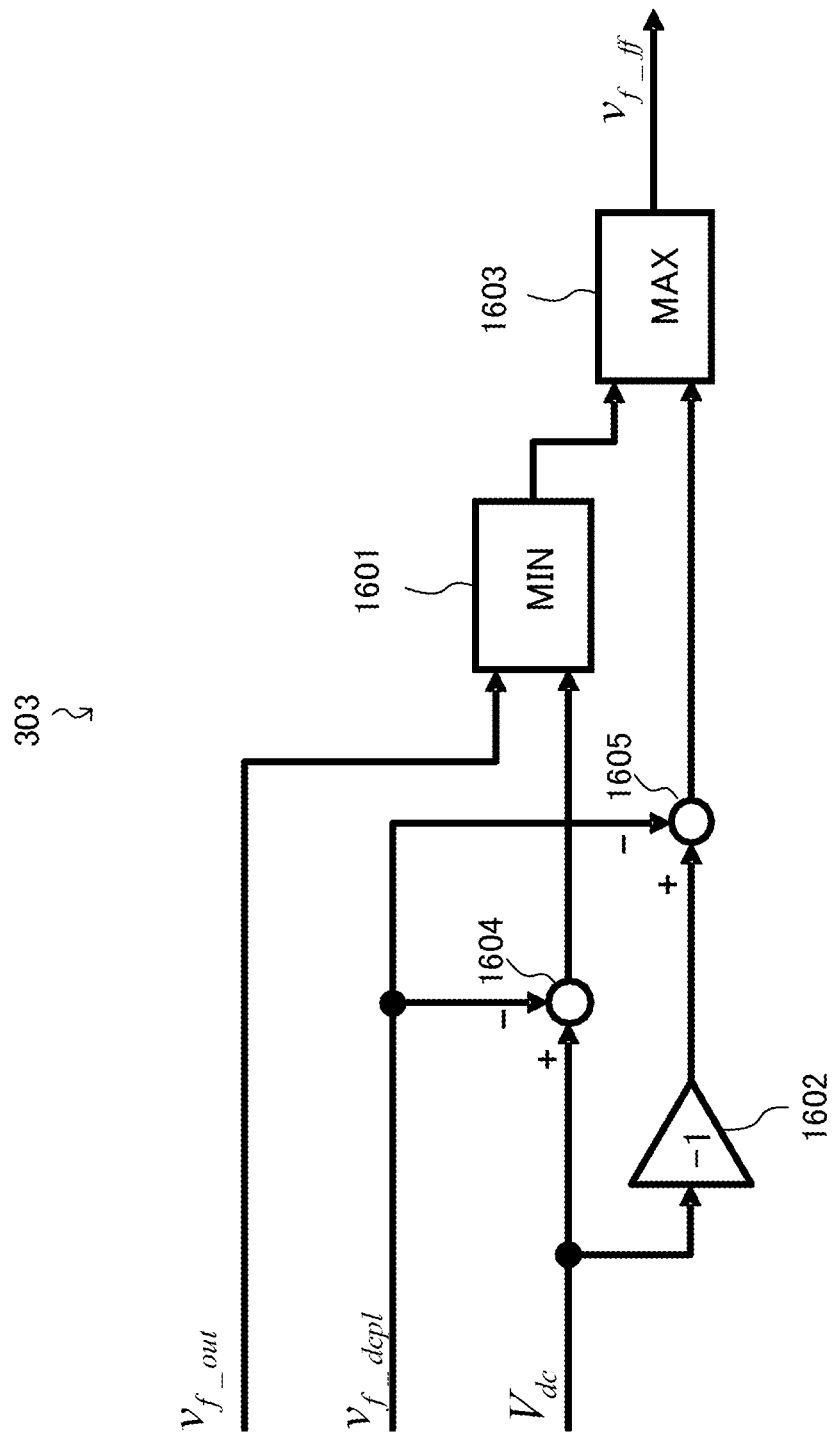
FIG. 19 illustrates a block diagram of a f-axis limit processing unit.

Next, the detailed configuration of the f-axis limit processing unit 303 will be described using FIG. 19. FIG. 19 illustrates a detailed block diagram of the f-axis limit processing unit 303. The f-axis limit processing unit 303 has a comparator 1601, an inverter 1602, a comparator 1603, and subtractors 1604 and 1605.

In the subtractor 1604, which is provided in the former stage of the comparator 1601, a subtraction value is obtained by subtracting the f-axis non-interference voltage $v_{f\_dc}$ outputted from the non-interference control unit 405 from the power supply voltage $V_{dc}$ of the battery 1. Then, the comparator 1601 compares the pseudo-FB voltage command value $V_{f\_pse\_fb}$, which is the output value from the f-axis current pseudo-F/B model 302, with the subtraction value in the subtractor 1604, and outputs a smaller value to the comparator 1603.

The inverter 1602 inverts the sign of the supply voltage $V_{dc}$.

The subtractor 1605 is provided in the former stage of the comparator 1603. The subtractor 1605 obtains the subtraction value by subtracting the f-axis non-interference voltage $V_{f\_dcpl}$ outputted from the non-interference control unit 405 from the output of the inverter 1602. Then, the comparator 1603 compares the output value of the comparator 1601 with the subtracted value in the subtractor 1605, and outputs the larger value thereof to f-axis current model 301 and to the adder 205.

With this configuration, in the f-axis limit processing unit 303, in order to obtain enough margin to add the f-axis non-interference voltage $v_{f\_dcpl}$ to the pseudo-FB voltage command value $V_{f\_pse\_fb}$, which is the output value of the f-axis current pseudo-F/B model 302, a limiting process is performed. In the limiting process, limitation based on the supply voltage $V_{dc}$ in which the f-axis non-interference voltage $V_{f\_dcpl}$ is negatively offset, is performed. Specifically, the upper limit is "$V_{dc\_}V_{f\_dcpl}$" and the lower limit is "$-V_{dc}-V_{f\_dcpl}$" in the limiting process.

Figure 20:
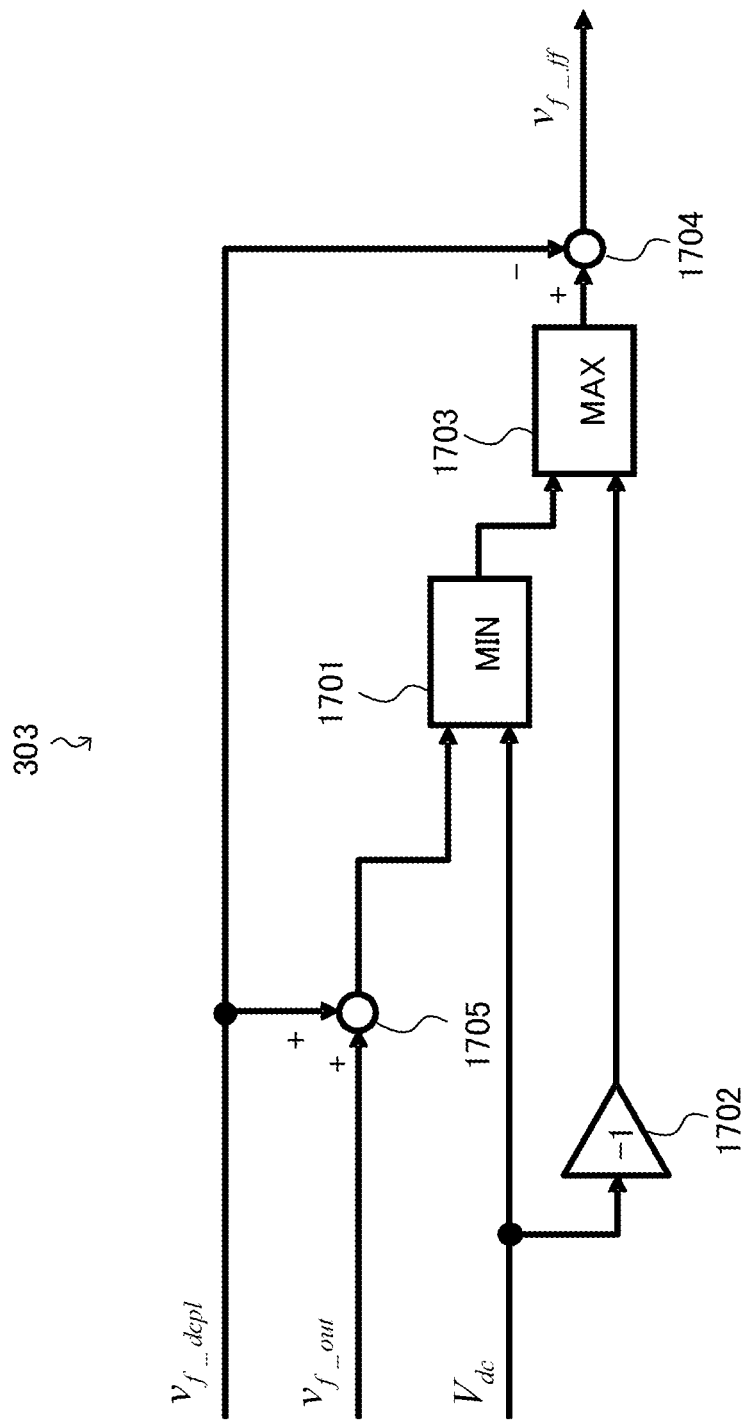
FIG. 20 illustrates another block diagram of the f-axis limit processing unit.

The f-axis limit processing unit 303 may be configured as shown in FIG. 20. FIG. 20 illustrates another example of the detailed block diagram of the f-axis limit processing unit 303. In this example, the f-axis limit processing unit 303 has a comparator 1701, an inversion unit 1702, a comparator 1703, a subtractor 1704, and an adder 1705.

The adder 1705 is provided in the former stage of the comparator 1701, and the adder 1705, and adds the f-axis non-interference voltage $V_{f\_dcpl}$ outputted from the non-interference control unit 405 to the f-axis the pseudo-FB voltage command value $v_{f\_pse\_fb}$ output from the f-axis current pseudo-F/B model 302. Then, comparator 1701 compares the supply voltage $V_{dc}$ of the battery 1 with the result of the addition in the adder 1705, and outputs a smaller value thereof to the comparator 1703.

The inversion unit 1702 inverses the sign of the supply voltage $V_{dc}$.

The comparator 1703 compares the output from the comparator 1701 with the output from the inversion unit 1702 and outputs a larger value to the subtractor 1704.

The subtractor 1704 subtracts the f-axis non-interference voltage $v_{f\_dcpl}$ outputted from the non-interference control unit 405 from the output value of the comparator 1703 to calculate the f-axis F/F compensation voltage $v_{f\_ff}$. The subtractor 1704 outputs the f-axis F/F compensation voltage $v_{f\_ff}$ to the f-axis current model 301 and the adder 205 constituting the f-axis current control unit 408.

Even with this configuration, in the f-axis limit processing unit 303, in order to obtain enough margin to add the f-axis non-interference voltage $v_{f\_dcpl}$ to the pseudo-FB voltage command value $v_{f\_pse\_fb}$, which is the output value of the f-axis current pseudo-F/B model 302, a limiting process is performed. In the limiting process, limitation based on the supply voltage $V_{de}$ in which the f-axis non-interference voltage $V_{f\_dcpl}$ is negatively offset, is performed. Specifically, the upper limit is "$V_{dc\_}V_{f\_dcpl}$" and the lower limit is "$-V_{dc}-V_{f\_dcpl}$" in the limiting process.

Figure 21:
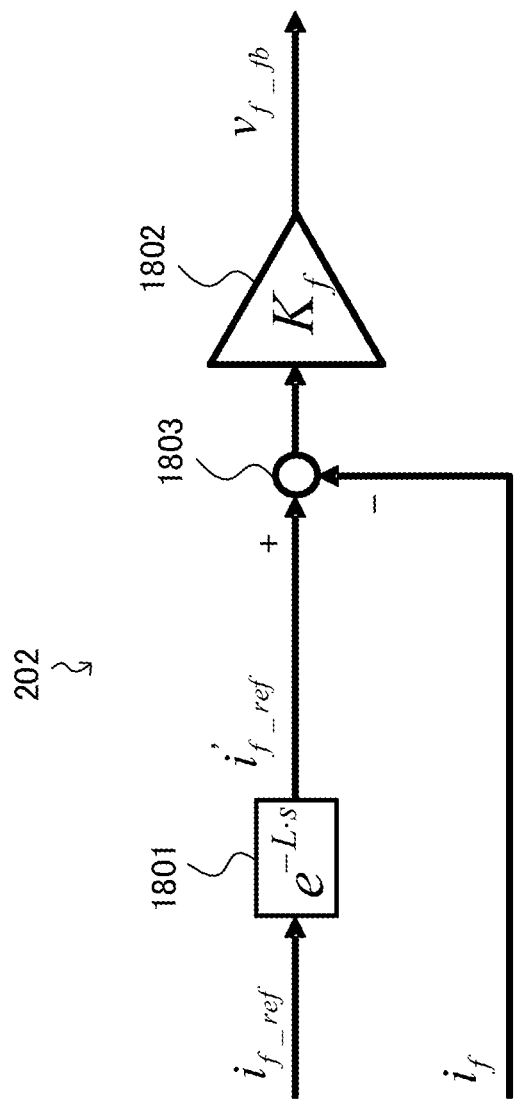
FIG. 21 illustrates a block diagram of the f-axis F/B compensator.

Next, details of the f-axis F/B compensator 202 will be described. FIG. 21 illustrates a detailed block diagram of the f-axis F/B compensator 202. The f-axis F/B compensator 202 has a block 1801, a multiplier 1802, and a subtractor 1803.

The block 1801 represents a delay filter, which delays the control system by a certain amount of latent time. The block 1801 delays the f-axis current normative response $i_{f\_ref}$ for an input of a f-axis current normative response $i_f$ output from the f-axis F/F compensator 201, calculates a f-axis current normative response after wasted time processing $i_{\_ref}'$ in order to match the phase of the f-axis current normative response $i_{\_ref}$ and the f-axis current $i_f$, and outputs the normative response to the subtractor 1803 provided in the first stage of the multiplier 1802. The latent time L of the control system corresponds to the control operation delay. The block 1801 is an example of the block that performs the delay step.

The subtractor 1803 calculates the subtraction result by subtracting the f-axis current $i_{f\_ref}'$ output from the A/D converter 107 from the f-axis current normative response after wasted time processing $i_{\_ref}'$ output from the block 1801.

The multiplier 1802 calculates the f-axis F/B compensation voltage $v_{f\_fb}$ by multiplying a f-axis F/B gain $K_f$ with the subtraction result in the subtractor 1803 as an input, and outputs the f-axis F/B compensation voltage $v_{f\_fb}$ to the adder 205. The value of the f-axis F/B gain $K_f$ is determined by an experimental adjust so that the stability of the gain margin, phase margin, etc. satisfies a predetermined standard.

With this configuration, the f-axis F/B compensation voltage $v_{f\_fb}$ based on the f-axis current $i_f$ is calculated in the f-axis F/B compensator 202.

Figure 22:
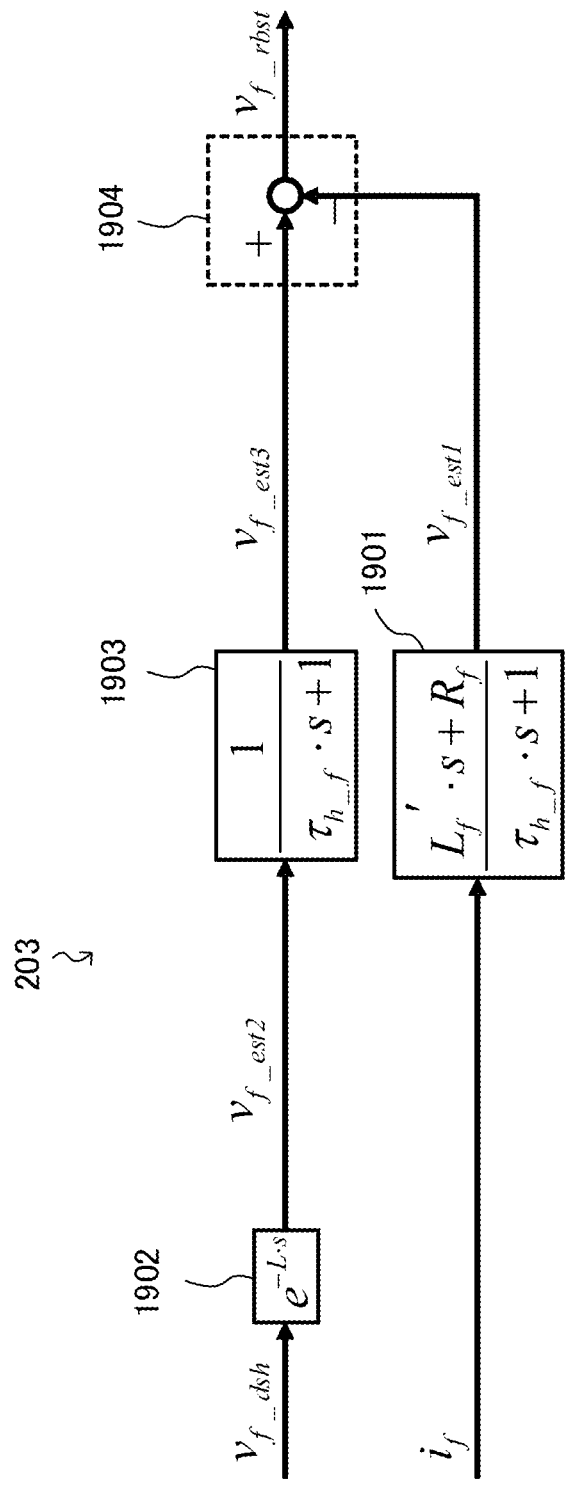
FIG. 22 illustrates a block diagram of the f-axis robust compensator.

FIG. 22 illustrates a detailed block diagram of the f-axis robust compensator 203. The f-axis robust compensator 203 includes a block 1901, a block 1902, a block 1903, and a subtractor 1904.

The block 1901 performs filter processing on the f-axis current $i_f$ outputted from the A/D converter 107 as the input to calculate the first f-axis voltage estimate $v_{f\_est1}$, and outputs the estimate to the subtractor 1904. The block 1901 is a delay filter with the characteristics of $(L_f'\cdot s + R_f)/(\tau_{h\_f}s+1)$, including the low-pass filter $1/(\tau_{h\_f}s+1)$ of the block 1903 described below.

The block 1902 represents the same delay filter as the block 1801. The block 1902 calculates a second f-axis voltage estimate $v_{f\_est2}$ by delaying the first f-axis voltage command value $v_{f\_dsh}$ outputted from the f-axis limit processing unit 204 by the latent time L that the control system has. Then, the block 1902 outputs the second f-axis voltage estimate $v_{f\_est2}$ to the block 1903.

The block 1903 represents a low pass filter with a characteristic of $1/(\tau_{h\_f}\cdot s+1)$. The block 1903 performs low-pass filter processing on the second f-axis voltage estimate $v_{f\_est2}$ outputted from the block 1902 to calculate a third f-axis voltage estimate $v_{f\_est3}$. Then, the block 1903 outputs the third f-axis voltage estimate $v_{f\_est3}$ to the subtractor 1904.

The subtractor 1904 subtracts the first f-axis voltage estimate $v_{f\_est1}$ from the third f-axis voltage estimate $v_{f\_est3}$ to calculate the f-axis robust compensation voltage $v_{f\_rbst}$ and send the voltage to the adder 206.

In this manner, the first f-axis voltage command value $v_{f\_dsh}$ is subjected to the processing of the block 1901, which is the delay filter, and the block 1903, which is a low-pass filter, and subtracting the first f-axis voltage estimate $v_{f\_est1}$ based on the measured value, such that the f-axis robust compensation voltage $v_{f\_rbst}$ is calculated in order to improve stability further.

Figure 23:
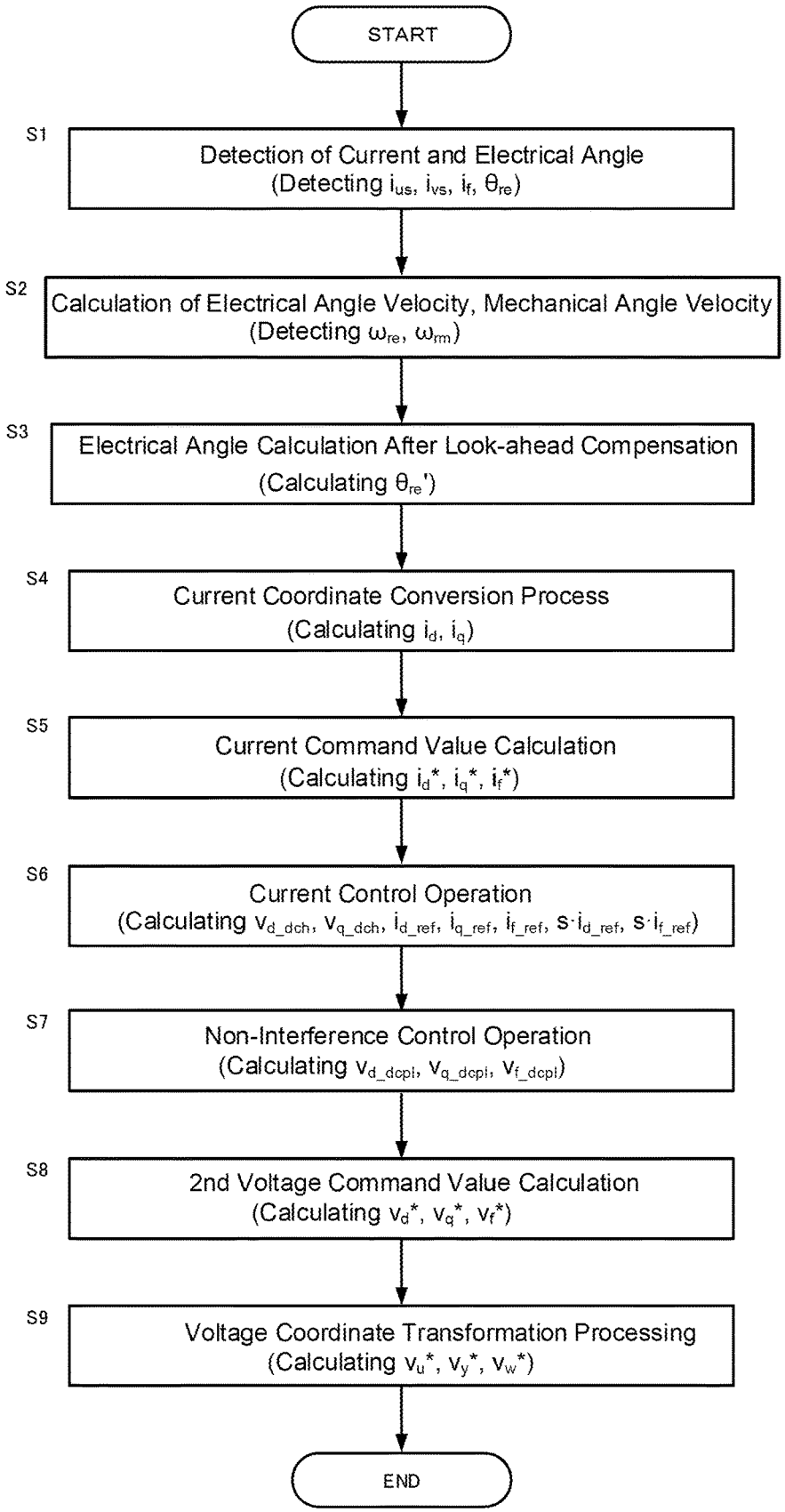
FIG. 23 illustrates a flowchart showing the motor control processing.

FIG. 23 is a flowchart showing the control processing of the motor 4 explained by using the above FIGS. 14 to 22. These controls are performed by the controller 2 by executing a predetermined program.

In step S1, the current values (u-phase current $i_{us}$, v-phase current $i_{vs}$, and f-axis current $i_f$), and the electric angle $\theta_{re}$ of the motor 4 are obtained by the A/D converter 411.

In step S2, based on the electric angle obtained in step S1, the mechanical angular velocity $\omega_{rm}$ as the motor rotation speed, and the electric angular velocity $\omega_{re}$ as the motor rotation speed, are calculated based on the electric angle $\theta_{re}$ obtained in step S1.

In step S3, the look-ahead compensation unit 403 calculates the after forward-read compensation electric angle $\theta_{re}'$, based on the electric angle calculated in step S2.

In step S4, the coordinate transformation unit 404 calculates the d-axis current $i_d$ and the q-axis current $i_q$ based on the u-phase current $i_u$ and the v-phase current $i_v$ calculated in step S1.

In step S5, the d-axis current command value $i_d^*$, the q-axis current command value $i_q^*$, and the f-axis current command value $i_f^*$ are calculated based on the motor speed $\omega_{rm}$, the torque command value T*, and the power supply voltage $V_{dc}$.

In step S6, a q-axis current control unit 406, a d-axis current control unit 407, the f-axis current control unit 408 calculate the first d-axis voltage command value $v_{q\_dsh}$, the d-axis current normative response $i_{d\_ref}$, the d-axis current normative response derivative value $s \cdot i_{d\_ref}$, the first q-axis voltage command value $v_{q\_dsh}$, the q-axis current normative response ref, the first f-axis voltage command value $v_{f\_dsh}$, and the f-axis current normative response $i_{\_ref}$, and the f-axis current normative response derivative value $s \cdot i_{f\_ref}$ are calculated.

In step S7, the non-interference control unit 405 calculates the electric angular velocity $\omega_{re}$ calculated in step S2, and the d-axis current normative response $i_{d\_ref}$, the derivative of the d-axis current normative response $s \cdot i_{d\_ref}$, q-axis current normative response $i_{q\_ref}$, the f-axis current normative response if ref, and the f-axis current normative response derivative value $s\ i_{f\_ref}$ calculated in step S6, the non-interference voltages $v_{d\_dcpl}$, $v_{q\_dcpl}$, and $v_{f\_dcpl}$.

In step S8, the voltage command value calculation unit 409 calculates the second d-axis voltage command value $v_d^*$, the second q-axis voltage command value $v_q^*$, and the second f-axis voltage command value $v_f^*$ by adding the non-interference voltages $v_{d\_dcpl}$, $v_{q\_dcpl}$, and $v_{f\_dcpl}$ calculated in step S7 to the first d-axis voltage command value $v_{d\_dsh}$, the first q-axis voltage command value $v_{q\_dsh}$, and the first f-axis voltage command value of $v_{f\_dsh}$ calculated in step S6, respectively.

In Step S9, the coordinate conversion unit 410 performs a coordinate conversion for the second d-axis voltage command value $v_d^*$, the second q-axis voltage command value $v_q^*$, and the second f-axis voltage command value $v_f^*$ calculated in Step S8, thereby calculating the voltage command values $v_u^*$, $v_v^*$, and $v_w^*$ for each uvw phase.

With the control described above, the controller 2 executes the processes of steps S1 to S9 to generate the command values for controlling the motor 4. Out of the generated command values, the voltage command values $v_u^*$, $v_v^*$, and $v_w^*$ calculated in step S9 are applied to the stator winding of the motor 4 through the PWM converter 102 and the inverter 103. The second f-axis voltage command value $v_f^*$, which is calculated in step S8, is applied to the rotor-side winding of the motor 4 through the f-axis current output unit 105. In this way, the rotation control of the motor 101 is performed.

As such, the above explanation for the motor control method for controlling the f-axis current $i_f$, taking into account the f-axis voltage saturation is described above. To apply such oscillation suppression control processing to the motor control, it is necessary to apply processing to the magnetic flux estimator 902 that includes the magnetic flux estimator 802 provided by the oscillation suppression calculation processing unit 2b by taking the f-axis voltage saturation into account.

Figure 24:
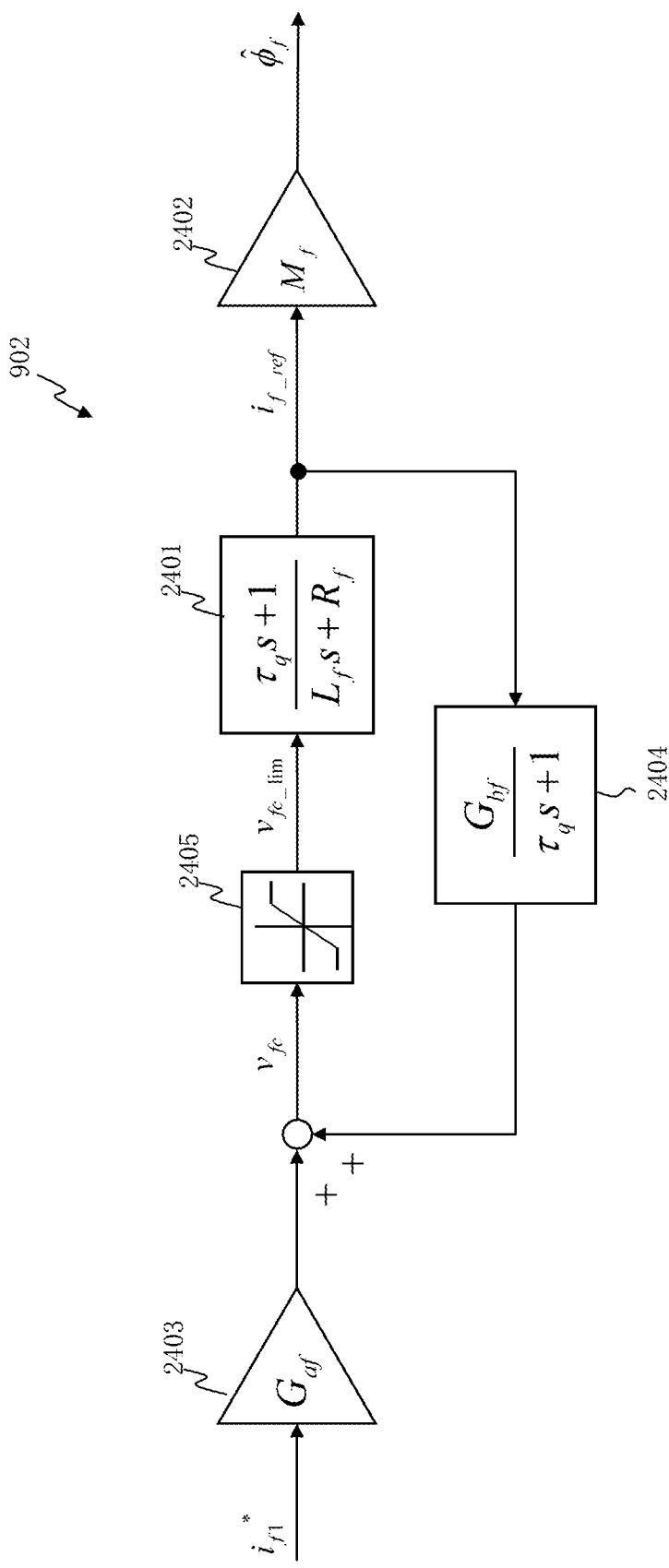
FIG. 24 illustrates a block diagram of a magnetic flux estimator of the second embodiment.

FIG. 24 illustrates a control block diagram of the magnetic flux estimator 902 of the second embodiment. The magnetic flux estimator 902 of this embodiment includes control blocks 2401 and 2404, a multiplier 2402, a control block 2403, a limiter 2405, and an adder 2406.

The control block 2401 represents an f-axis model that models the transfer characteristics from the f-axis voltage $v_f$ to the f-axis current $i_f$. The f-axis model has a characteristic $(\tau_q s+1)/(L_f s+R_f)$. In the control block 2401 takes the f-axis current normative response $v_{fc\_lim}$ by taking into account the f-axis voltage saturation characteristics outputted from the limiter 2405 as an input, and the control block 2401 calculates the f-axis current normative response $i_{f\_ref}$ that by taking into account the transfer characteristics from the f-axis voltage $v_f$ to the f-axis current $i_f$, and outputs the response to the multiplier 2402 and the control block 2404.

The multiplier 2402 calculates the magnetic flux estimate $\varphi f$ by multiplying the f-axis current normative response $i_{f\_ref}$ by a mutual inductance Mf between the stator and the rotor. The mutual inductance Mf may be obtained by using the value at any operating point of the motor 4 (representative operating point) or by referring to the map data stored in advance.

The control block 2403 includes the gain $G_{af}$. The gain $G_{af}$ is shown in equation (30) above. The control block 2403 outputs the value obtained by multiplying the input f-axis current command value $i_{f1}^*$ by the gain $G_{af}$ to the adder 2406.

The control block 2404 represents a filter consisting of the gain $G_{bf}$ and $1/(\tau_q s+1)$. The gain $G_{bf}$ is shown in Equation (30) above. The control block 2404 outputs the value obtained by the filtering process to the f-axis current normative response if ref to the adder 2406.

The adder 2406 calculates the f-axis voltage command value $v_{fc}$ by adding together the output values of the control blocks 2403 and 2404 respectively. The calculated f-axis voltage command value $v_{fc}$ is outputted to the f-axis limiter 2405.

As described above, the magnetic flux estimator 902 of the present embodiment has a control block 2403 and a control block 2404, and the current F/B system (f-axis current F/B model) is configured by multiplying the f-axis current command value in* by the gain $G_{af}$ and by multiplying the f-axis current normative response $i_{f\_ref}$ by the gain $G_{bf}$. This allows the f-axis current response to match the transfer characteristics of the primary delay (see Equation (6)) when there is no f-axis voltage saturation.

The f-axis limiter 2405 simulates the f-axis voltage saturation characteristics by limiting the f-axis current command value $v_{fc}$ according to the supply voltage $V_{dc}$. This allows the magnetic flux estimator 902 to calculate the f-axis current normative response $i_{f\_ref}$ in which the f-axis voltage saturation characteristic is taken into account in the control block 2401 arranged in the later stage.

In addition, the oscillation suppression calculation processing unit 2b (see FIG. 8) of this embodiment can calculate the q-axis current normative response $i_{q2}*$ taking the q-axis current response delay into account by applying the phase advance compensation ($\tau_q s+1$) of the q-axis current response to the control blocks 2401 and 2404 provided by the magnetic flux estimator 802. In other words, the magnetic flux estimate φf^ of this embodiment is calculated by performing phase advance compensation for q-axis current response for the f-axis model and the f-axis current F/B model in the pseudo-F/B system composed of the f-axis model modeled to have the characteristics for converting the f-axis voltage $v_f$ to the rotor current $i_f$, the f-axis current F/B model in which the f-axis current command value $i_{f1}*$ and the output of the f-axis model are inputted, and the f-axis limiter 2405 for limiting the output of the f-axis current F/B model. This allows the oscillation suppression calculation processing unit 2b to properly simulate the f-axis current response when there is f-axis voltage saturation.

Figure 25:
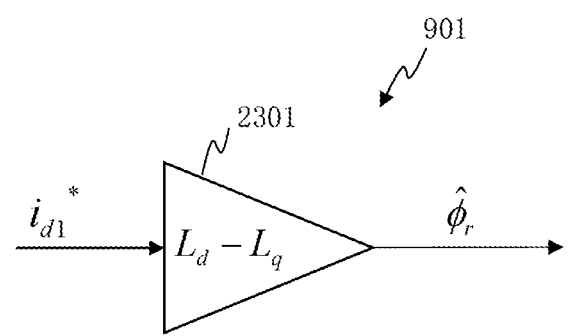
FIG. 25 illustrates a block diagram of a reluctance-torque equivalent flux estimator of the second embodiment.

Next, the reluctance torque equivalent magnetic flux estimator 901 of this embodiment is described. When the current is controlled so that the d-axis current response time constant and q-axis current response time constant match, the configuration of the reluctance torque equivalent magnetic flux estimator 901 can be simplified compared to the configuration shown in the first embodiment (see FIG. 10). FIG. 25 illustrates a control block diagram of the reluctance torque equivalent magnetic flux estimator 901 that is simplified. The reluctance torque equivalent magnetic flux estimator 901 of this embodiment includes a multiplier 2301.

The multiplier 2301 calculates the reluctance torque equivalent magnetic flux estimate φr^ by multiplying the d-axis current command value $i_{d1}*$ outputted from the first current command value calculator 801 by the difference $L_d - L_q$ between the d-axis inductance $L_d$ and the q-axis inductance $L_q$. The d-axis inductance $L_d$ and q-axis inductance $L_q$ may be obtained by using the values at any operating point of the motor 4 (representative operating point) or by referring to a map data stored in advance. In the case where the current is controlled so that the d-axis current response time constant and q-axis current response time constant are the same, when the q-axis current response is compensated for phase advance for the transmission characteristics of the primary delay that simulates the d-axis current response delay, the relevant transfer characteristics becomes one. For this reason, the configuration of the reluctance torque equivalent magnetic flux estimator 901 shown in this embodiment can be simplified compared to the configuration shown in the first embodiment (see FIG. 10).

By applying the magnetic flux estimator 802 above-mentioned to the oscillation suppression calculation processing unit 2b, the response delay of the magnetic flux and the effect of the reluctance torque can be taken into account to suppress the drive shaft torsional oscillation.

In the following, the effects of the control method (oscillation suppression control process) of the electric vehicle of the second embodiment are described with reference to FIG. 26.

Figure 26:
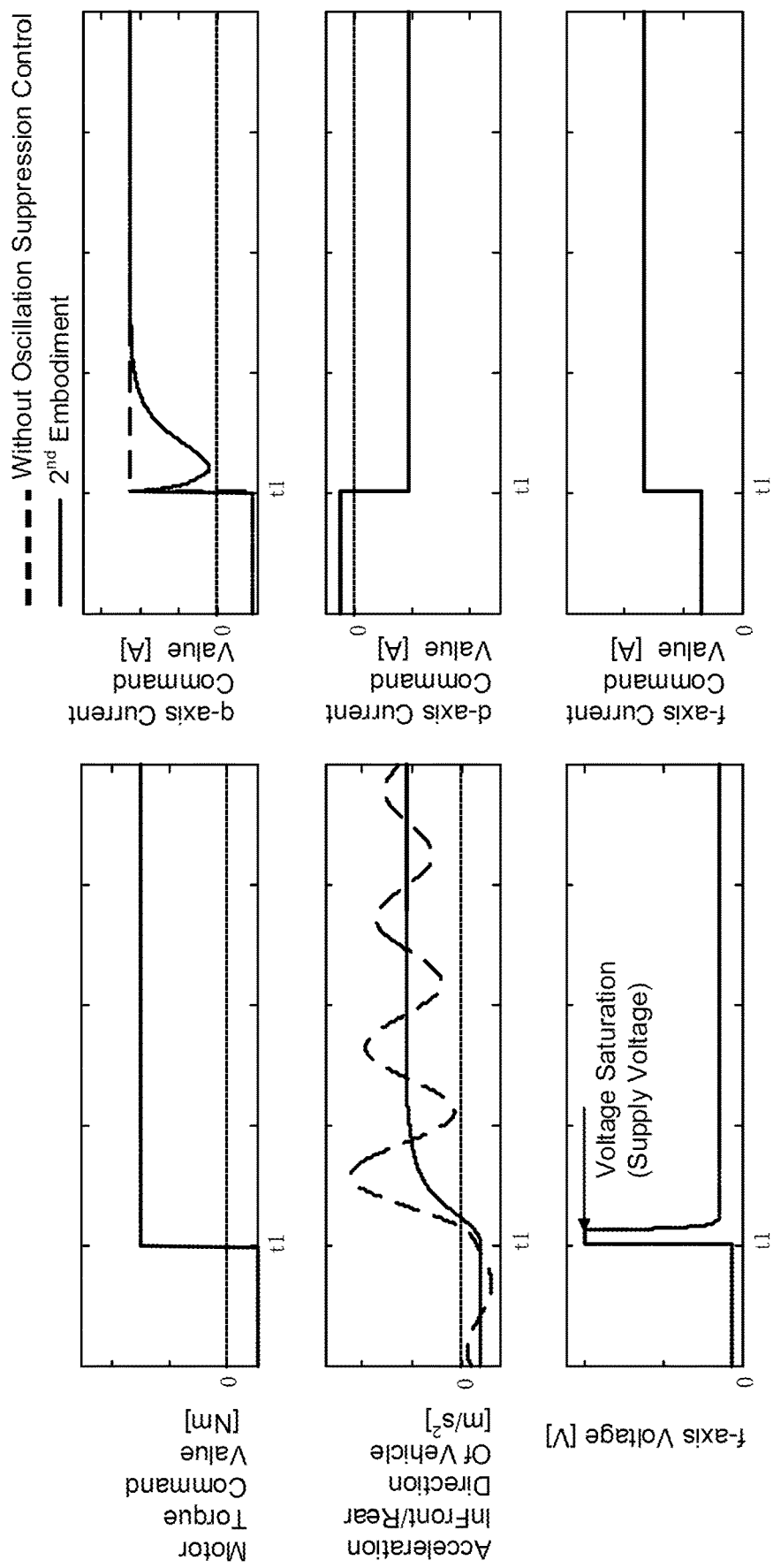
FIG. 26 illustrates a time chart showing control results by the control method for the electric vehicle of the second embodiment.

FIG. 26 illustrates a time chart showing the control results of this embodiment. The horizontal axis represents time, the vertical axis represents motor torque command value [Nm], vehicle front/rear acceleration [m/s2], and f-axis voltage [V] in the order from left, and q-axis current command value [A], d-axis current command value [A], and f-axis current command value [A] in the order from top right. The solid line in the figure shows this embodiment, and the dotted line shows the control using conventional technology (conventional example).

FIG. 26 illustrates a scene in which the motor torque command value is changed in a stepwise manner at the timing of t1 to accelerate (rising) during the vehicle is decelerating by the regenerative torque of the motor 4. In the control represented in this time chart (this embodiment and the conventional control), the motor torque command value (final torque command value) that suppresses drive shaft torsional oscillation by taking into account the effect of gear backlash is calculated by applying the method disclosed in JP5900609B.

In the control of this embodiment in this time chart, the f-axis current normative response time constant (see the control block 701 ($\tau_f$)) is set to a value at which f-axis voltage saturation occurs. As shown in the solid line, when this embodiment is applied, the motor torque that suppresses the drive shaft torsional oscillation is realized by the q-axis current command value $i_{q2}*$ calculated by considering the d-axis current $i_d$ and f-axis current $i_f$ (see FIG. 8), and it can be seen that the vehicle front/rear acceleration oscillation is suppressed.

On the other hand, in the conventional controlling method, since the d-axis current and the f-axis current are not taken into consideration, the acceleration oscillation occurs in front and the rear direction of the vehicle due to the effect of the backlash of the gears.

According to the control method of the electric vehicle of the second embodiment described above, the magnetic flux estimate φf^ of this embodiment is calculated by performing the phase advance compensation in the system that has the f-axis model, which is modeled with the characteristics to convert from the f-axis voltage $V_f$ to the f-axis current $i_f$, and the f-axis limiter 2405, which limits the output of the f-axis current F/B model. In the phase advance compensation, the q-axis current response is phase advancing compensated against the f-axis model and the f-axis current F/B model. This allows the oscillation suppression calculation processing unit 2b to properly simulate the f-axis current response when there is f-axis voltage saturation.

The above description of the embodiment of the present invention is only a partial example of the application of the present invention, and is not intended to limit the technical scope of the present invention for the specific configuration of the above embodiment.

The invention claimed is:

1. A method for controlling an electric vehicle having a field winding type synchronous motor for providing a driving force, the field winding type synchronous motor that has a rotor having a rotor winding and a stator having a stator winding, by controlling a stator current flowing in the stator winding and a rotor current flowing in the rotor winding, the method comprising:

setting a basic torque command value based on a vehicle information;

calculating a d-axis current command value and a first q-axis current command value for the stator current, and a f-axis current command value for the rotor current, based on the basic torque command value and the vehicle information;

calculating a magnetic flux estimate value, which is an estimated value of a magnetic flux generated in the rotor, based on the d-axis current command value and the f-axis current command value;

calculating a final torque command value, based on the first q-axis current command value and the magnetic flux estimate value;

calculating a second q-axis current command value, based on the magnetic flux estimate value and the final torque command value; and controlling the stator current and the rotor current, based on the second q-axis current command value, the d-axis current command value and the f-axis current command value.

2. The method for controlling the electric vehicle according to claim 1, wherein the final torque command value is calculated by performing an oscillation suppression control for suppressing a torsional oscillation in a drive shaft torque transmission system using a filter, the filter being applied to a torque command value before the oscillation suppression control, the torque command value before the oscillation suppression control being calculated on the basis of the first q-axis current command value and the magnetic flux estimate value, such that a natural oscillation frequency component in the drive shaft torque transmission system of the electric vehicle is removed.

3. The method for controlling the electric vehicle according to claim 1, wherein the second q-axis current command value is calculated by dividing the final torque command value by the magnetic flux estimate value.

4. The method for the electric vehicle according to claim 1, the method further comprising:

calculating a field magnetic flux estimate value, which is an estimated value of a field magnetic flux of the rotor, based on the f-axis current command value; and calculating an equivalent magnetic flux estimate value, which is equivalent to a reluctance torque generated in the rotor, based on the d-axis current command value, wherein the magnetic flux estimate value is calculated by adding the field magnetic flux estimate value and the equivalent magnetic flux estimate value.

5. The method for controlling the electric vehicle according to claim 4, wherein the field magnetic flux estimate value is calculated using a transmission characteristic that is formed by executing a phase-advanced compensation of the q-axis current response for a f-axis current transfer characteristic, the f-axis current transfer characteristic being formed by simulating a response delay with respect to the f-axis current command value for a f-axis current, which constitutes the rotor current.

6. The method for controlling the electric vehicle according to claim 5, wherein the f-axis current transfer characteristic is a transfer function of a primary delay.

7. The method for controlling the electric vehicle according to claim 4, wherein the field magnetic flux estimate value is calculated in a pseudo feedback (F/B) system, where a phase-advanced compensation of a q-axis current response for a f-axis model and a f-axis current F/B model is performed, the pseudo F/B system being formed by:

the f-axis model that is formed by modeling a characteristic from a f-axis voltage to a f-axis current, the f-axis current constituting the rotor current;

a f-axis current F/B model where the f-axis current command value and an output from the f-axis model are input; and a f-axis limiter that limits an output from the f-axis current F/B model.

8. The method for controlling the electric vehicle according to claim 4, wherein the equivalent magnetic flux estimate value is calculated using a transmission characteristic that is formed by executing a phase-advanced compensation of the q-axis current response for the d-axis current transfer characteristic, the d-axis current transfer characteristic being formed by simulating a response delay with respect to the d-axis current command value for a d-axis current, which constitutes the rotor current.

9. A control device for controlling an electric vehicle having a field winding type synchronous motor, the field winding type synchronous motor having a rotor having a rotor winding and a stator having a stator winding, and a controller configured to control a stator current flowing in the stator winding and a rotor current flowing in the rotor winding, the controller is configured to:

set a basic torque command value based on a vehicle information;

calculate a d-axis current command value and a first q-axis current command value for the stator current, and a f-axis current command value for the rotor current, based on the basic torque command value and the vehicle information;

calculate a magnetic flux estimate value, which is an estimated value of a magnetic flux generated in the rotor, based on the d-axis current command value and the f-axis current command value;

calculate a final torque command value, based on the first q-axis current command value and the magnetic flux estimate value;

calculate a second q-axis current command value, based on the magnetic flux estimate value and the final torque command value; and control the stator current and the rotor current, based on the second q-axis current command value, the d-axis current command value and the f-axis current command value.

10. The method for the electric vehicle according to claim 2, the method further comprising:

calculating a field magnetic flux estimate value, which is an estimated value of a field magnetic flux of the rotor, based on the f-axis current command value; and calculating an equivalent magnetic flux estimate value, which is equivalent to a reluctance torque generated in the rotor, based on the d-axis current command value, wherein the magnetic flux estimate value is calculated by adding the field magnetic flux estimate value and the equivalent magnetic flux estimate value.

11. The method for the electric vehicle according to claim 3, the method further comprising:
calculating a field magnetic flux estimate value, which is an estimated value of a field magnetic flux of the rotor, based on the f-axis current command value; and
calculating an equivalent magnetic flux estimate value, which is equivalent to a reluctance torque generated in the rotor, based on the d-axis current command value,
wherein the magnetic flux estimate value is calculated by adding the field magnetic flux estimate value and the equivalent magnetic flux estimate value.

* * * * *